(12) United States Patent
Nishimura et al.

(10) Patent No.: US 8,941,805 B2
(45) Date of Patent: Jan. 27, 2015

(54) LIQUID CRYSTAL DISPLAY DEVICE AND ELECTRONIC APPARATUS

(71) Applicant: Japan Display West Inc., Chita-Gun, Aichi-Ken (JP)

(72) Inventors: Joji Nishimura, Matsumoto (JP); Tatsuya Yata, Ogaki (JP); Hayato Kurasawa, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 0 days.

(21) Appl. No.: 14/170,037

(22) Filed: Jan. 31, 2014

(65) Prior Publication Data

US 2014/0146281 A1      May 29, 2014

Related U.S. Application Data

(63) Continuation of application No. 12/560,839, filed on Sep. 16, 2009.

(30) Foreign Application Priority Data

Oct. 14, 2008   (JP) ................................. 2008-264870
Oct. 14, 2008   (JP) ................................. 2008-264871

(51) Int. Cl.
    *G02F 1/1343*      (2006.01)
    *G02F 1/1333*      (2006.01)
(52) U.S. Cl.
    CPC .................... *G02F 1/134363* (2013.01); *G02F 2001/133397* (2013.01); *G02F 2001/134345* (2013.01); *G02F 2001/134372* (2013.01); *G02F 2001/134381* (2013.01); *G02F 2201/40* (2013.01)
    USPC ....................................................... 349/141

(58) Field of Classification Search
    CPC .................... G02F 1/134363; G02F 1/134381; G02F 2001/134318; G02F 2001/134381
    USPC ......................................................... 349/141
    See application file for complete search history.

(56) References Cited

U.S. PATENT DOCUMENTS 6,111,627 A *  8/2000  Kim et al. ..................... 349/141
6,396,556 B1 * 5/2002  Watanabe ..................... 349/141

(Continued)

FOREIGN PATENT DOCUMENTS

JP     10-048652     2/1998
JP     11-030783     2/1999

(Continued)

OTHER PUBLICATIONS

Japanese Office Action issued Nov. 13, 2012 for corresponding Japanese Appln. No. 2008-264870.

(Continued)

*Primary Examiner* — Dennis Y Kim
(74) *Attorney, Agent, or Firm* — K&L Gates LLP

(57) ABSTRACT

Provided is a liquid crystal display device including: first and second substrates with a liquid crystal layer interposed therebetween; a first electrode formed on the liquid crystal layer side of the first substrate and having linear portions; a second electrode having linear portions formed along the linear portions of the first electrode and adjacent to the linear portions of the first electrode at a gap in plan view; and a third electrode formed on the liquid crystal layer side of the second substrate and having linear portions overlapping with the linear portions of the second electrode in plan view, wherein electric fields having different directions are generated between the first electrode and the second electrode and between the first electrode and the third electrode.

4 Claims, 25 Drawing Sheets

(56) References Cited

U.S. PATENT DOCUMENTS

| | | | |
|---|---|---|---|
| 6,642,984 B1* | 11/2003 | Yoshida et al. | 349/139 |
| 2001/0010575 A1 | 8/2001 | Yoshida et al. | |
| 2004/0263749 A1* | 12/2004 | Jeong et al. | 349/141 |
| 2006/0139544 A1* | 6/2006 | Ko et al. | 349/141 |
| 2008/0137018 A1* | 6/2008 | Lin et al. | 349/141 |
| 2010/0128189 A1* | 5/2010 | Teranishi et al. | 349/33 |

FOREIGN PATENT DOCUMENTS

| | | |
|---|---|---|
| JP | 11-231344 | 8/1999 |
| JP | 2000-081641 | 3/2000 |
| JP | 2001-056476 | 2/2001 |
| JP | 2003-140188 | 5/2003 |
| JP | 2004-354407 | 12/2004 |
| JP | 2008-040189 | 2/2008 |

OTHER PUBLICATIONS

Japanese Office Action issued Nov. 13, 2012 for corresponding Japanese Appln. No. 2008-264871.

U.S. Office Action issued Apr. 15, 2014 in related U.S. Appl. No. 12/560,839.

* cited by examiner

LIQUID CRYSTAL DISPLAY DEVICE AND ELECTRONIC APPARATUS

CROSS REFERENCES TO RELATED APPLICATIONS

The present application is a Continuation of U.S. application Ser. No. 12/560,839, filed on Sep. 16, 2009, which claims priority to Japanese Patent Application JP 2008-264870 filed in the Japanese Patent Office on Oct. 14, 2008, and Japanese Patent Application JP 2008-264871 filed in the Japanese Patent Office on Oct. 14, 2008, the entire contents of which is being incorporated herein by reference.

BACKGROUND

1. Technical Field

The present invention relates to a liquid crystal display device and an electronic apparatus.

2. Related Art

As a liquid crystal display device, a vertical electric field mode liquid crystal display device such as a Twisted Nematic (TN) mode, a Vertical Alignment (VA) mode or a Multi-domain Vertical Alignment (MVA) mode is widely used, but a lateral electric field mode liquid crystal display device including electrodes on one substrate is also known. In the lateral electric field mode liquid crystal display device, the operation principle of an In-Plane Switching (IPS) mode liquid crystal display device will be described with reference to FIGS. 22 and 23 (for example, see JP-A2003-140188).

FIG. 22 is a schematic plan view of one pixel seen through a color filter substrate CF of a known IPS mode liquid crystal display device 150 FIG. 23 is a cross-sectional view taken along line XXIII-XXIII of FIG. 22.

This IPS mode liquid crystal display device 150 includes an array substrate AR and a color filter substrate CF. In the array substrate AR, a plurality of scanning lines 154 and common lines 156 is provided in parallel on the surface of a first transparent substrate 152, and a plurality of signal lines 158 is provided in a direction crossing the scanning lines 154 and the common lines 156. On a central portion of each pixel, for example, a comb teeth-shaped counter electrode (also referred to as a "common electrode") 160 is provided from each of the common lines 156 in a band shape and a comb teeth-shaped pixel electrode 162 is provided so as to be fitted into the counter electrode 160. The surfaces of the counter electrode 160 and the pixel electrode 162 are, for example, covered by a protective insulating film 164 formed of silicon nitride and an alignment film 166 formed of a polyimide or the like.

In addition, a Thin Film Transistors (TFT) functioning as a switching element is formed at an intersection of each of the scanning lines 154 and each of the signal lines 158. In this TFT, a semiconductor layer 168 is disposed between each of the scanning lines 154 and each of the signal lines 158, a portion of each of the signal lines on the semiconductor layer 168 configures a source electrode S of the TFT, a portion of each of the scanning lines 154 under the semiconductor layer 168 configures a gate electrode G, a conductive layer partially overlapping with a portion of the semiconductor layer 168 configures a drain electrode D, and this drain electrode D is connected to the pixel electrode 162.

In the color filter substrate CF, a color filter layer 172, an overcoat layer 174 and an alignment film 176 are provided on the surface of a second transparent substrate 170. The array substrate AR and the color filter substrate CF face each other such that the pixel electrode 162 and the counter electrode 160 of the array substrate AR and the color filter layer 172 of the color filter substrate CF face each other. Subsequently, liquid crystal LC is filled between the array substrate AR and the color filter substrate CF, and polarization plates 178 and 180 are arranged on the outsides of both substrates such that the polarization directions thereof cross each other, thereby forming the IPS mode liquid crystal device 150.

As shown in FIG. 23, in the IPS mode liquid crystal display device 150, if an electric field is generated between the pixel electrode 162 and the counter electrode 160, the liquid crystal aligned in a horizontal direction turns in the horizontal direction such that the transmission amount of light incident from a backlight can be controlled.

Next, the operation principle of a Fringe Field Switching (FFS) mode liquid crystal display device will be described with reference to FIGS. 24 and 25 (for example, see 2001-56476).

FIG. 24 is a schematic plan view of one pixel seen through a color filter substrate CF of a known FFS mode liquid crystal display device 190. FIG. 25 is a cross-sectional view taken along line XXV-XXV of FIG. 24.

This FFS mode liquid crystal display device 190 includes an array substrate AR and a color filter substrate CF. In the array substrate AR, a plurality of scanning lines 194 and common lines 196 is provided in parallel on the surface of a first transparent substrate 192, and a plurality of signal lines 198 is provided in a direction crossing the scanning lines 194 and the common lines 196. A counter electrode (also referred to as a "common electrode") 200 formed of a transparent material, such as Indium Tin Oxide (ITO) or Indium Zinc Oxide (IZO), and connected to each of the common lines 196 so as to cover a region partitioned by each of the scanning lines 194 and each of the signal lines 198 is provided. A pixel electrode 206 formed of a transparent material such as ITO and having a plurality of slits 204 formed therein in a stripe shape is provided on the surface of the counter electrode 200 with an insulating film 202 interposed therebetween. The surfaces of the pixel electrode 206 and the plurality of slits 204 are covered by an alignment film 208.

A TFT functioning as a switching element is formed in the vicinity of an intersection of each of the scanning lines 194 and each of the signal lines 198. In this TFT, a semiconductor layer 210 is disposed on the surface of each of the scanning lines 194, a portion of each of the scanning lines 198 extends so as to cover a portion of the surface of the semiconductor layer 210 such that a source electrode S is configured, a portion of each of the scanning lines under the semiconductor layer 210 configures a gate electrode G, a conductive layer partially overlapping with a portion of the semiconductor layer 210 configures a drain electrode D, and this drain electrode D is connected to the pixel electrode 206.

In the color filter substrate CF, a color filter layer 214, an overcoat layer 216 and an alignment film 218 are provided on the surface of a second transparent substrate 212. The array substrate AR and the color filter substrate CF face each other such that the pixel electrode 206 and the counter electrode 200 of the array substrate AR and the color filter layer 214 of the color filter substrate CF face each other. Subsequently, liquid crystal LC is filled between the array substrate AR and the color filter substrate CF, and polarization plates 220 and 222 are arranged on the outsides of both substrates such that polarization directions thereof cross each other, thereby forming the FFS mode liquid crystal device 190.

In the FFS mode liquid crystal display device 190, if an electric field is generated between the pixel electrode 206 and the counter electrode 200, as shown in FIG. 25, this electric field is directed to the counter electrode 200 at both sides of the pixel electrode 206. Accordingly, the liquid present on the pixel electrode 206 as well as the liquid crystal present in the slits 204 may move.

However, in the IPS mode liquid crystal display device 150, it is difficult to twist liquid crystal molecules on the electrodes by the size of the electric field strength such that brightness of display deteriorates. In the FFS mode liquid crystal display device 190, it is difficult to twist liquid crystal molecules on the electrodes or between the electrodes by the size of the electric field strength such that brightness of display deteriorates.

SUMMARY

The following aspects of the invention can be realized.

According to an aspect of the invention, there is provided a liquid crystal display device including: first and second substrates with a liquid crystal layer interposed therebetween; a first electrode formed on the liquid crystal layer side of the first substrate and having linear portions; a second electrode having linear portions formed along the linear portions of the first electrode and adjacent to the linear portions of the first electrode at a gap in plan view; and a third electrode formed on the liquid crystal layer side of the second substrate and having linear portions overlapping with the linear portions of the second electrode in plan view, wherein electric fields of different directions are generated between the first electrode and the second electrode and between the first electrode and the third electrode.

The linear portions of the first electrode and the second electrode are formed adjacent to each other at a gap in plan view, and respectively correspond to a pixel electrode and a counter electrode of an IPS mode liquid crystal display device. In addition, in the invention, the term "parallel" is not necessarily completely parallel if the electrodes do not cross each other, and includes a "<" shape, a zigzag shape and so on.

The linear portions of the second electrode and the linear portions of the third electrode are formed so as to overlap with each other in plan view, and the electric field is generated between the first electrode and the third electrode. Accordingly, in addition to the lateral electric field between the linear portions of the first electrode and the linear portions of the second electrode, the liquid crystal molecules may move by the electric field between the linear portions of the first electrode and the linear portions of the third electrode, and thus a bright display can be realized without increasing a driving voltage. Accordingly, the liquid crystal display device capable of enhancing (improving) the brightness or improving the driving voltage (low driving voltage) is provided.

In the liquid crystal display device, the third electrode may be formed of a transparent conductive material.

Since the third electrode is formed of the transparent conductive material, in particular, the light from the backlight is not shielded by the third electrode and thus a liquid crystal display device capable of realizing a bright display is obtained. In addition, the first electrode and the second electrode may be formed of a metallic material like the known IPS mode liquid crystal display device, but is preferably formed of the transparent conductive material in view of luminance rise. In addition, a known material such as ITO or IZO may be used as the transparent conductive material.

In the liquid crystal display device, a potential of the third electrode may be at least one of a potential of the second electrode, an intermediate potential between the voltage of the first electrode and the voltage of the second electrode, a fixed potential or a floating state in potential.

By setting the potential of the third electrode to a defined potential, it is possible to prevent the linear portions of the third electrodes from disturbing the alignment of the liquid crystal.

In the liquid crystal display device, the linear portions of the third electrode may have a longitudinal direction along the scanning lines or signal lines formed on the first substrate.

Since the third electrode can be efficiently formed in the vicinity of the switching element or the like, a numerical aperture can be enlarged without waste.

The liquid crystal display device may further include a fourth electrode having linear portions formed nearer the first substrate side than the first electrode and the second electrode with an insulating film interposed therebetween, and a fifth electrode having linear portions formed along the linear portions of the fourth electrode and adjacent to the linear portions of the fourth electrode at a gap in plan view, the first electrode may be formed such that the linear portions thereof overlap with those of one of the fourth electrode and the fifth electrode in plan view, and the second electrode may be formed such that the linear portions thereof overlap with those of the other of the fourth electrode and the fifth electrode in plan view, and the first electrode may be electrically connected to the other of the fourth electrode and the fifth electrode, and the second electrode may be electrically connected to one of the fourth electrode and the fifth electrode.

The first electrode is formed such that the linear portions thereof overlap with those of one of the fourth electrode and the fifth electrode in plan view, and the second electrode is formed such that the linear portions thereof overlap with those of the other of the fourth electrode and the fifth electrode in plan view. In addition, the fourth electrode is electrically connected to the other of the first electrode and the second electrode and the fifth electrode is electrically connected to one of the first electrode and the second electrode. Accordingly, two pairs of electrodes overlapping with each other in plan view with the insulating film interposed therebetween have the same arrangement relationship as the FFS mode liquid crystal display device and the pairs of electrodes adjacent on the same plane have the same arrangement relationship as the IPS mode liquid crystal display device.

Capacitors are formed in the two pairs of electrodes overlapping with each other in plan view with the insulating film interposed therebetween, and the capacitors are connected in parallel. As a result, since the storage capacitor larger than that of the known FFS mode liquid crystal display device is formed, a liquid crystal display device with less flickers is obtained. In addition, since the driving of the liquid crystal in the FFS mode can be realized in all the electrodes, a bright display can be realized, an intermediate configuration of the IPS mode and the FFS mode is obtained with respect to symmetry of the electrodes, generation of a DC component is reduced, and a burn-in phenomenon is improved. The FFS mode liquid crystal display device having the IPS mode property, in which the burn-in phenomenon or flicker is hard to occur, the numerical aperture is large and a bright display is realized, and is obtained.

In the liquid crystal display device, the widths of the linear portions of the fourth electrode and the linear portions of the fifth electrode may be larger than those of the linear portions of the first electrode and the linear portions of the second electrode, respectively.

Since the characteristics of the FFS mode liquid crystal display device appears strongly, a high applied voltage is necessary. However, since good fringe field effect is generated in all the electrodes, a liquid crystal display device capable of realizing a brighter display is obtained. In addition, since allowance for pair shifting is increased when the liquid crystal display device of this aspect is manufactured, the liquid crystal display device is easily manufactured.

In the liquid crystal display device, the widths of the linear portions of the fourth electrode and the linear portions of the fifth electrode may be equal to those of the linear portions of the first electrode and the linear portions of the second electrode, respectively.

By this configuration, the allowance for misalignment of a mask upon manufacture is decreased but the applied voltage may be low. In addition, since the fringe field is generated in all the electrodes, a liquid crystal display device capable of realizing a bright display is obtained.

According to another aspect of the invention, there is provided a liquid crystal display device including a plurality of sub pixel regions, the device including: first and second substrates with a liquid crystal layer interposed therebetween; a first electrode formed on the liquid crystal layer side of the first substrate; a second electrode formed nearer the liquid crystal layer side than the first electrode with an insulating film interposed therebetween and having a plurality of linear portions in a region overlapping with the first electrode in plan view, wherein a third electrode having a plurality of linear portions is formed on the liquid crystal layer side of the second substrate, the linear portions of the third electrode do not overlap with the linear portions of the second electrode in plan view and have portions formed along the linear portions of the second electrode, and electric fields are generated between the second electrode and the third electrode and between the second electrode and the first electrode.

The linear portions of the first electrode and the second electrode are formed with the insulating film interposed therebetween, and correspond to the pixel electrode and the counter electrode of the FFS mode liquid crystal display device.

The linear portions of the second electrode and the linear portions of the third electrode are formed so as not to overlap with each other in plan view, and the electric field is generated between the second electrode and the third electrode. Accordingly, in addition to the lateral electric field between the first electrode and the second electrode, the liquid crystal molecules may move by the electric field between the linear portions of the second electrode and the linear portions of the third electrode, and thus a bright display can be realized without increasing the driving voltage. As a result, the transmissivity can be improved without decreasing the space between the linear portions of the second electrode on the first substrate side. In addition, the driving voltage can be decreased by the electrode configuration (the width between the electrodes or the width of the counter electrode) or the electrode location. Accordingly, the liquid crystal display device capable of enhancing (improving) brightness or improving the driving voltage (low driving voltage) is provided.

In the liquid crystal display device, the third electrode may be formed of a transparent conductive material.

Since the third electrode is formed of the transparent conductive material, in particular, the light from the backlight is not shielded by the third electrode and thus a liquid crystal display device capable of realizing a bright display is obtained. In addition, the second electrode may be formed of a metal material like the known FFS mode liquid crystal display device, but is preferably formed of the transparent conductive material in view of luminance rise. In addition, a known material such as ITO or IZO may be used as the transparent conductive material.

In the liquid crystal display device, a potential of the third electrode may be at least one of a potential of the second electrode, an intermediate potential between the voltage of the first electrode and the voltage of the second electrode, a fixed potential or a floating state in potential.

By setting the potential of the third electrode to a defined potential, it is possible to prevent the linear portions of the third electrodes from disturbing the alignment of the liquid crystal.

In the liquid crystal display device, the linear portions of the third electrode may have a longitudinal direction along scanning lines or signal lines formed on the first substrate.

Since the third electrode can be efficiently formed in the vicinity of the switching element or the like, a numerical aperture can be enlarged without waste.

In the liquid crystal display device, gaps between the linear portions of the third electrode may be different in at least one of the sub pixel regions.

Since allowance for pair shifting when the first and second substrates are assembled is increased, it is possible to reduce deterioration of transmissivity due to pair shifting.

According to another aspect of the invention, there is provided an electronic apparatus including the above-described liquid crystal display device in a display unit.

By including the liquid crystal display device in the display unit, it is possible to realize high-quality display in the display unit.

Additional features and advantages are described herein, and will be apparent from the following Detailed Description and the figures.

BRIEF DESCRIPTION OF THE FIGURES

The invention will be described with reference to the accompanying drawings, wherein like numbers reference like elements.

DETAILED DESCRIPTION

Hereinafter, liquid crystal display devices according to embodiments of the invention will be described with references to the accompanying drawings. In each view used for the embodiments, the scale of each layer or each member is differentiated from each other in order that each layer or each member has a size capable of being identified in the view.

First Embodiment

Figure 1:
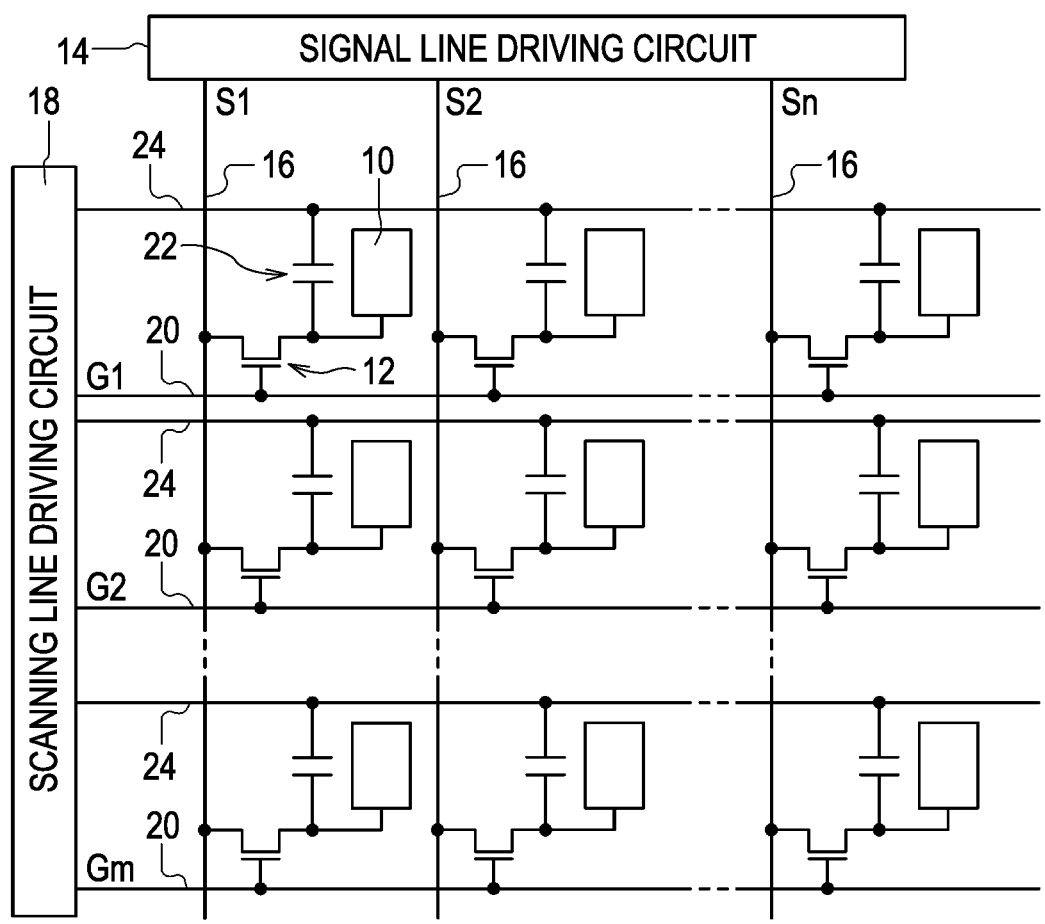
FIG. 1 is a circuit diagram of a plurality of sub pixel regions formed in a matrix configuring a liquid crystal display device according to a first embodiment of the invention.

FIG. 1 is a circuit diagram of a plurality of sub pixel regions formed in a matrix configuring a liquid crystal display device 2 according to the present embodiment.

In an image display region of the liquid crystal display device 2 according to the present embodiment, a plurality of sub pixels regions is arranged in a matrix. In each of the sub pixel regions, a first electrode 10 and a TFT 12 for controlling switching of the first electrode 10 are formed. Each of signal lines 16 extending from a signal line driving circuit 14 is electrically connected to a source of the TFT 12. The signal line driving circuit 14 supplies image signals Si, S2, ..., and Sn to pixels via the signal lines 16. The image signals Si to Sn may be line-sequentially supplied in this order or may be supplied to a group of a plurality of adjacent signal lines 16.

Each of scanning lines 20 extending from a scanning line driving circuit 18 is electrically connected to a gate of the TFT 12. The scanning line driving circuit 18 supplies scanning signals G1, G2, ..., and Gm to the scanning lines 20 at predetermined timings in a pulsed manner. Each of the scanning signals G1 to Gm are line-sequentially applied to the gate of the TFT 12 in this order. The first electrode 10 is electrically connected to a drain of the TFT 12. The TFT 12 functioning as the switching element is turned on only during a predetermined period by the input of each of the scanning signals G1, G2, ..., and Gm such that each of the image signals S1, S2, ..., and Sn supplied from the signal lines 16 is written in the first electrode 10 at a predetermined timing.

Each of the image signals S1, S2, ..., and Sn having a predetermined level and written in the liquid crystal via the first electrode 10 is held by a liquid crystal capacitor formed between the first electrode 10 and a common electrode during a predetermined period. In order to prevent the held image signal from being leaked, a storage capacitor 22 is formed in parallel to the liquid crystal capacitor. The storage capacitor 22 is interposed between the drain of the TFT 12 and a capacitive line 24.

Figure 3:
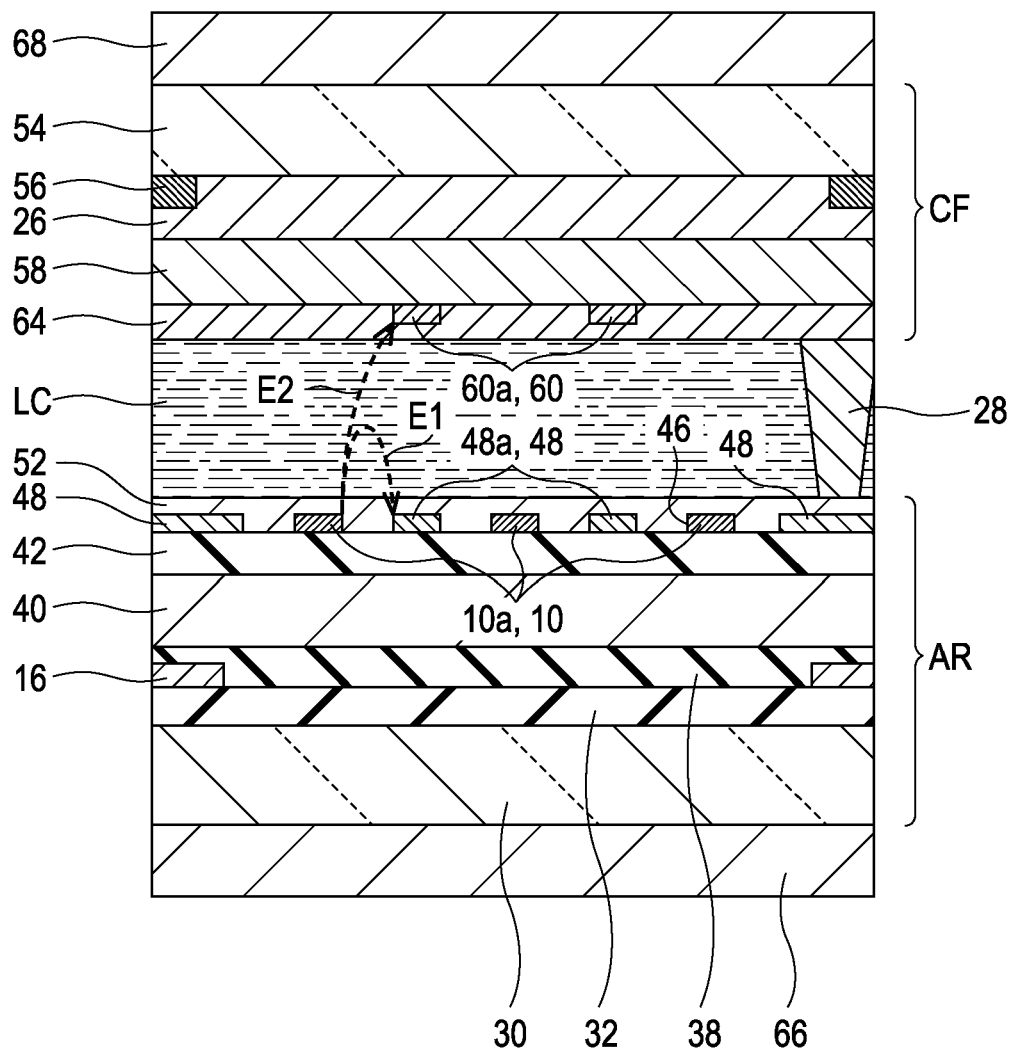
FIG. 3 is a partial cross-sectional view taken along line III-III of FIG. 2.
Figure 4:
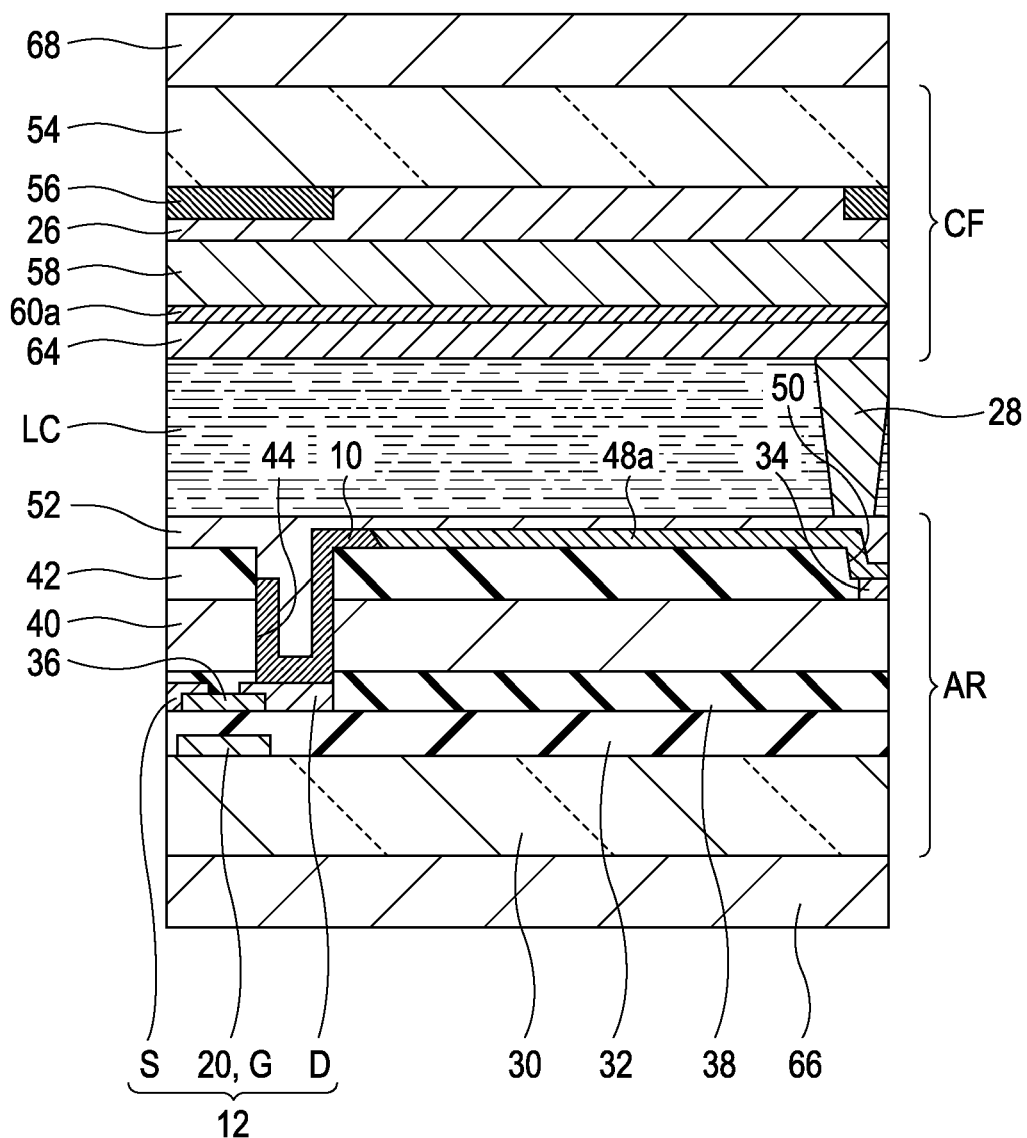
FIG. 4 is a partial cross-sectional view taken along line IV-IV of FIG. 2.

Next, the planar and cross-sectional configurations of the liquid crystal display device 2 will be described with reference to FIGS. 2 to 4.

Figure 2:
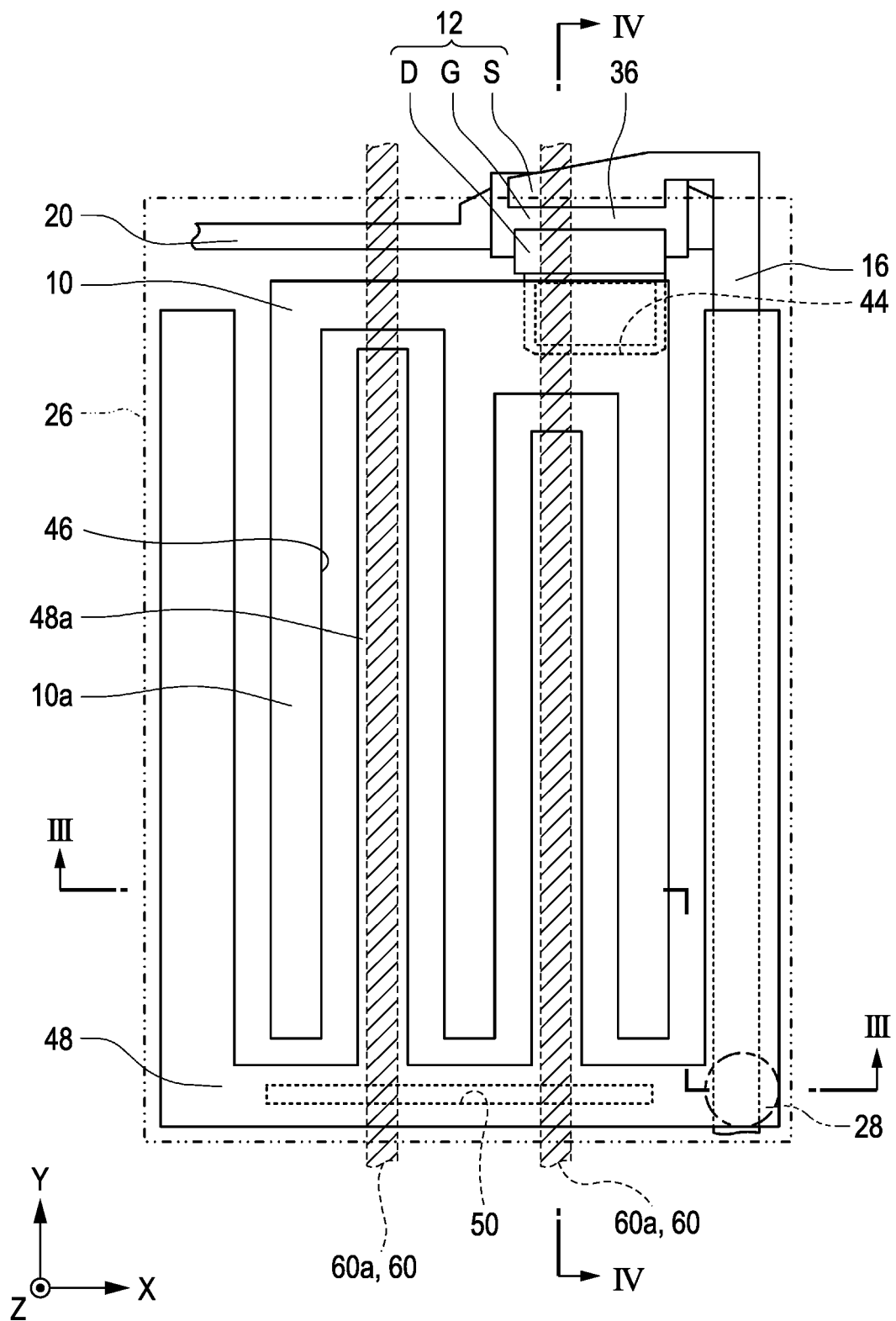
FIG. 2 is a plan view of any one sub pixel seen through a color filter substrate of the liquid crystal display device according to the first embodiment of the invention.

FIG. 2 is a plan view of any one sub pixel seen through a color filter substrate CF of the liquid crystal display device 2 according to the present embodiment. FIG. 3 is a partial cross-sectional view taken along line III-III of FIG. 2, and FIG. 4 is a partial cross-sectional view taken along line IV-IV of FIG. 2.

In each of the sub pixel regions of the liquid crystal display device 2 according to the present embodiment, the color filter layer 26 having the substantially same planar shape as the sub pixel region is provided. A columnar spacer 28 for separating the array substrate AR and the color filter substrate CF at a predetermined gap and constantly holding a liquid crystal layer thickness (cell gap) is erected on a right lower corner of each of the sub pixel regions.

The liquid crystal display device 2 includes the array substrate (first substrate) AR and the color filter substrate (second substrate) CF. In the array substrate AR, a plurality of scanning lines 20 and signal lines 16 is formed in a matrix on the surface of a display region of a first transparent substrate 30 such as a glass substrate so as to cross each other in a state of being insulated from each other by a gate insulating film 32, and a common line 34 is formed at a peripheral edge portion of the display region. Each of regions surrounded by the scanning lines 20 and the signal lines 16 forms each pixel (also referred to as a "sub pixel"). On the first transparent substrate 30, the TFT 12 is, for example, formed in each pixel as the switching element. In this TFT 12, a semiconductor layer 36 is disposed on the surface of each of the scanning lines 20, a portion of each of the signal lines 16 extends so as to cover a portion of the surface of the semiconductor layer 36 such that a source electrode S is configured, a portion of each of the scanning lines under the semiconductor layer 36 configures a gate electrode G, a conductive layer partially overlapping with a portion of the semiconductor layer 36 configures a drain electrode D, and this drain electrode D is connected to the first electrode 10. A passivation film 38 formed of, for example, a silicon nitride layer or a silicon oxide layer is coated over the entire surface of the first transparent substrate 30 including the TFT 12.

A planarization film 40 formed of an organic material is formed on the surface of the passivation film 38, and an insulating film 42 formed of a silicon nitride layer or a silicon oxide layer is formed on the surface of the planarization film 40 over the entire surface of the first transparent substrate 30. A first contact hole 44 is formed in the insulating film 42, the planarization film 40 and the passivation film 38 at a location corresponding to the drain electrode D of the TFT 12. The first electrode 10 and a second electrode 48 respectively having linear portions 10a and 48a extending along the signal lines 16 are formed on the surface of the insulating film 42 with a first separation region 46 interposed therebetween (so as to be adjacent to each other at a gap in plan view) in parallel in each pixel. The first electrode 10 has a plurality of linear portions 10a and has a longitudinal direction in a Y-axis direction (extending direction of the signal lines 16/the lines for supplying the signals). The second electrode 48 has a plurality of linear portions 48a and has a longitudinal direction in the Y-axis direction. The first electrode 10 and the second electrode 48 are preferably formed of a transparent conductive material such as ITO or IZO, in order to enlarge a numerical aperture so as to realize a bright display, but may be formed of a metal material such as aluminum.

The first electrode 10 is electrically connected to the drain electrode D of the TFT 12 via the first contact hole 44, and the second electrode 48 is electrically connected to the common line 34 via a second contact hole 50 formed in the insulating film 42. Accordingly, in the liquid crystal display device 2, the first electrode 10 functions as a pixel electrode and the second electrode 48 functions as a counter electrode.

Accordingly, a pair of the linear portions 10a of the first electrode 10 and the linear portions 48a of the second electrode 48 which are adjacent to each other on the same plane has the arrangement relationship of an IPS mode liquid crystal display device. Any one of the first electrode 10 and the second electrode 48 is arbitrarily set as the pixel electrode. However, the pair of electrodes which are adjacent to each other on the same plane needs to be a pair of the pixel electrode and the counter electrode. [0001] A first alignment film 52 is formed over the entire display region including the surfaces of the first electrode 10 and the second electrode 48.

In addition, in the color filter substrate CF, a light shielding film 56 is formed on the surface of a second transparent substrate 54 such as a glass substrate so as to cover locations corresponding to the scanning lines 20, the signal lines 16, the first contact hole 44, the second contact hole 50 and the TFT 12 of the array substrate AR. A color filter layer 26 having a predetermined color is formed on the surface of the second transparent substrate 54 surrounded by the light shielding film 56. In addition, an overcoat layer 58 is formed so as to cover the surfaces of the light shielding film 56 and the color filter layer 26.

A patterned third electrode 60 formed of an ITO film is formed on the overcoat layer 58 in each pixel. By this configuration, the third electrode 60 formed on the surface of the overcoat layer 58, for example, equalizes irregularities due to the presence of the color filter layer 26 or the like so as to become flat, and thus a cell gap becomes uniform. Therefore, according to the liquid crystal display device 2 of the present embodiment, a liquid crystal display device having good display quality is obtained. The third electrode 60 has a plurality of linear portions 60a and has a longitudinal direction in the Y-axis direction. The linear portions 60a of the third electrode 60 are arranged so as to overlap with the linear portions 48a of the second electrode 48 in plan view. The third electrode 60 has slits formed herein so as to overlap with the linear portions 10a of the first electrode 10 in plan view. By this configuration, since the third electrode 60 can be efficiently formed even in the vicinity of the TFT 12 or the like, the numerical aperture can be enlarged without waste.

As the potential of the third electrode 60, at least one of the same potential as the second electrode 48, an intermediate potential of the first electrode 10 and the second electrode 48, a fixed potential, a floating state and so on is applied. By this configuration, by setting the potential of the third electrode 60 to a defined potential, it is possible to prevent the linear portions 60a of the third electrode 60 from disturbing the alignment of the liquid crystal LC. In addition, a potential having a pulse shape may be applied to the third electrode 60.

By this configuration, it is possible to permit high-speed response.

A predetermined potential may be applied to such a third electrode 60, instead of the case where the third electrode is brought into a floating state in potential. When the predetermined potential is applied to the third electrode 60, the third electrode 60 formed on the side of the liquid crystal LC of the color filter substrate CF and the lines (not shown) formed on the array substrate AR are electrically connected. In contrast, when the third electrode 60 is brought into the floating state, the conduction between the substrates is omitted. The third electrode 60 is preferably formed of a transparent conductive material such as ITO or IZO in order to enlarge the numerical aperture so as to realize a bright display, but may be formed of a metal material such as aluminum.

A second alignment film 64 is formed on the surfaces of the overcoat layer 58 and the third electrode 60.

The array substrate AR and the color filter substrate CF face each other such that the linear portions 48a of the second electrode 48 of the array substrate AR and the linear portions 60a of the third electrode 60 of the color filter substrate CF face each other, and the liquid crystal LC is filled therebetween As the material of the liquid crystal LC, any one of a liquid crystal material having negative dielectric constant anisotropy or a liquid crystal material having positive dielectric constant anisotropy may be used, but the liquid crystal material of negative dielectric constant anisotropy is preferably used. If the liquid crystal material with negative dielectric constant anisotropy is used, a viewing angle under application of a selective voltage (voltage on) widens and the display characteristics of the display device are not damaged. In addition, by using the liquid crystal having negative dielectric constant anisotropy, the influence of a vertical electric field due to pair shifting can be reduced and thus allowance for pair shifting can be improved. In addition, in the linear portions 60a of the third electrode 60, in order to minimize the influence of pair shifting, an electrode for applying a potential by pair shifting may be selected. In addition, the gap between the linear portions 60a of the third electrode 60 in one pixel may be arbitrarily shifted such that the influence of pair shifting is minimized.

A first polarization plate 66 and a backlight device (not shown) are disposed outside the array substrate AR, and a second polarization plate 68 is disposed outside the color filter substrate CF, thereby completing the liquid crystal display device 2. A retardation film may be disposed between the substrates AR and CF and the polarization plates 66 and 68, if necessary.

Next, the operation of the liquid crystal display device 2 will be described.

In the liquid crystal display device 2, the first electrode 10 functions as the pixel electrode, and the second electrode 48 and the third electrode 60 function as the counter electrode. In addition, the linear portions 48a of the second electrode 48 and the linear portions 60a of the third electrode 60 overlap with each other in plan view with the first alignment film 52, the liquid crystal LC and the second alignment film 64 interposed therebetween. Accordingly, when the liquid crystal display device 2 is activated, as shown in FIG. 3, an electric field E1 is applied between the linear portions 10a of the first electrode 10 and the linear portions 48a of the second electrode 48, and an electric field E2 is applied between the linear portions 10a of the first electrode 10 and the linear portions 60a of the third electrode 60.

The liquid crystal molecules may move by the electric field E2 applied between the linear portions 10a of the first electrode 10 and the linear portions 60a of the third electrode 60. In addition, the operation by the electric field E1 applied between the linear portions 10a of the first electrode 10 and the linear portions 48a of the second electrode 48 is equal to that of the known IPS mode liquid crystal display device 150 shown in FIGS. 15 and 16. Accordingly, the liquid crystal display device 2 operates as the IPS mode liquid crystal display device between the linear portions 10a of the first electrode 10 and the linear portions 48a of the second electrode 48.

Comparison of Transmissivity-Driving Voltage Characteristics

Figure 5:
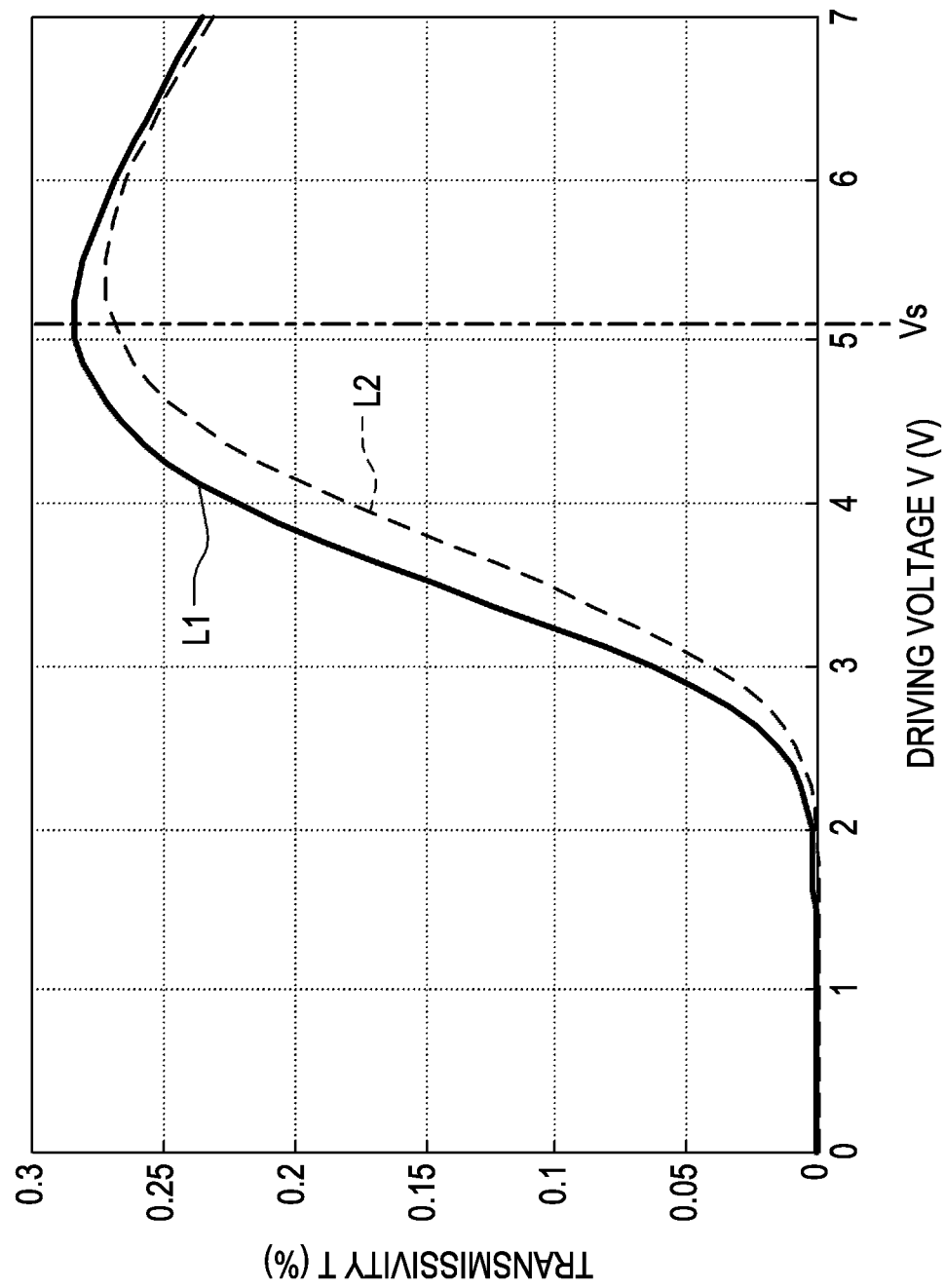
FIG. 5 is a graph of T-V characteristics of the liquid crystal display device according to the first embodiment of the invention and a known IPS structure.

FIG. 5 is a graph of transmissivity T-driving voltage V characteristics of the liquid crystal display device 2 according to the present embodiment and the known IPS mode liquid crystal display device. In addition, a graph L1 denotes the transmissivity T-driving voltage V characteristics of the liquid crystal display device 2 and a graph L2 denotes the transmissivity T-driving voltage V characteristics of the known IPS mode liquid crystal display device.

When the graphs L1 and L2 of the transmissivity T-driving voltage V characteristics are compared, the light transmissivity under application of the selective voltage Vs of the liquid crystal display device 2 is higher than that of the known IPS mode liquid crystal display device.

According to the present embodiment, in addition to the lateral electric field E1 between the linear portions 10a of the first electrode 10 and the linear portions 48a of the second electrode 48, the liquid crystal molecules may move by the electric field E2 between the linear portions 10a of the first electrode 10 and the linear portions 60a of the third electrode 60, and thus a bright display can be realized without increasing the driving voltage. As a result, the transmissivity can be improved without decreasing the first separation region 46 on the side of the array substrate AR. Accordingly, the liquid crystal display device 2 capable of enhancing (improving) brightness or improving the driving voltage (low driving voltage) is provided.

Second Embodiment

Figure 7:
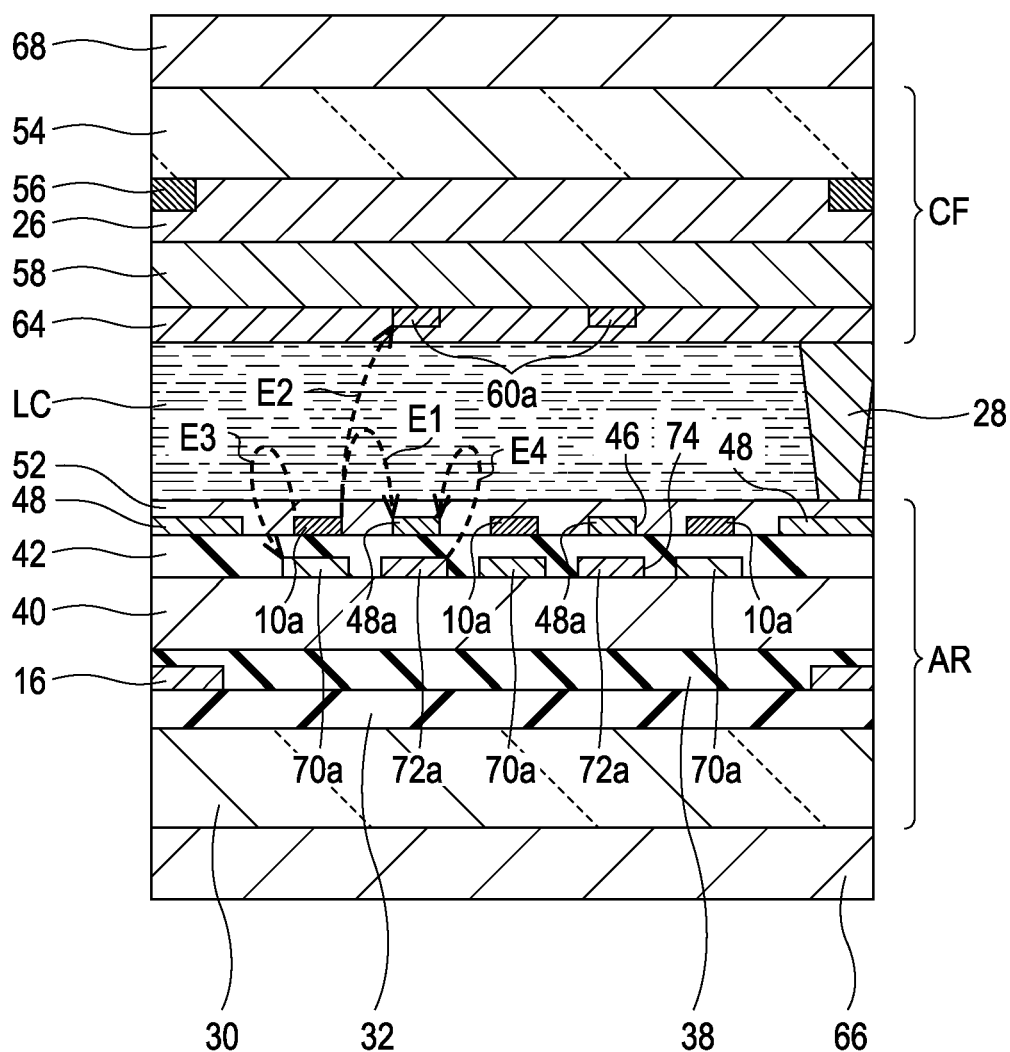
FIG. 7 is a partial cross-sectional view taken along line VII-VII of FIG. 6.
Figure 8:
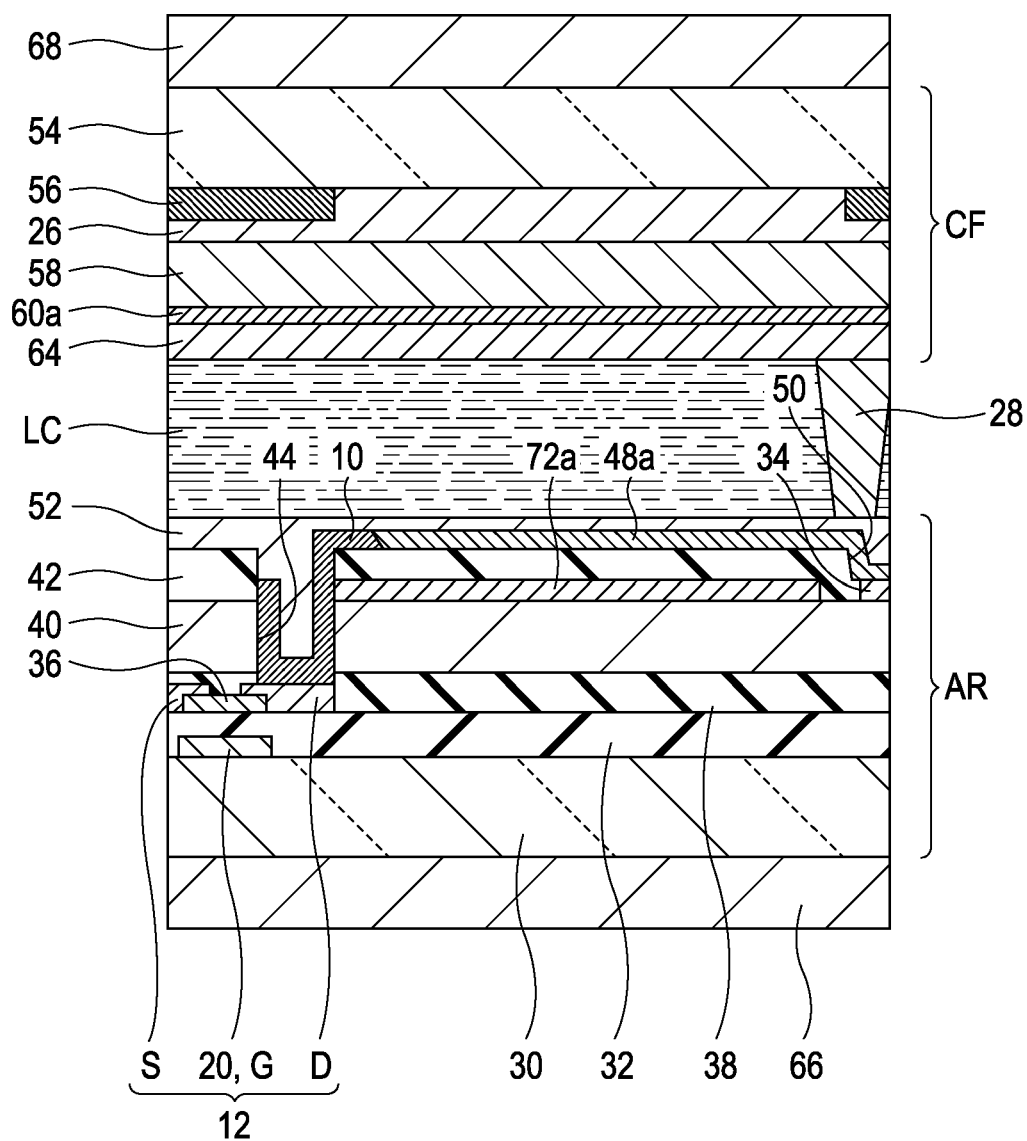
FIG. 8 is a partial cross-sectional view taken along line VIII-VIII of FIG. 6.

Next, a liquid crystal display device 4 according to a second embodiment will be described with reference to FIGS. 6 to 8.

Figure 6:
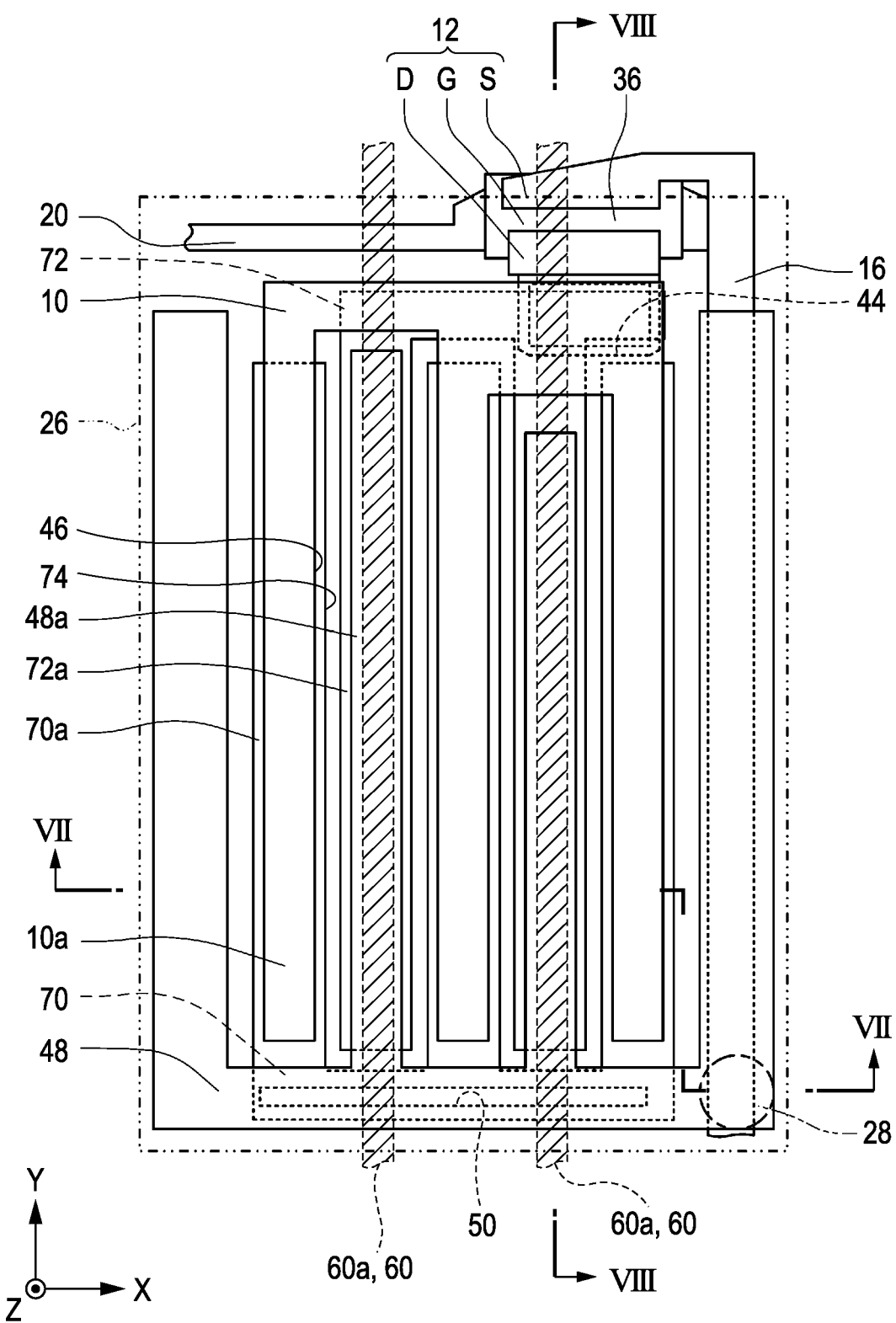
FIG. 6 is a plan view of any one sub pixel seen through a color filter substrate of a liquid crystal display device according to a second embodiment of the invention.

FIG. 6 is a plan view of any one sub pixel seen through a color filter substrate CF of the liquid crystal display device 4 according to the present embodiment. FIG. 7 is a partial cross-sectional view taken along line VII-VII of FIG. 6. FIG. 8 is a partial cross-sectional view taken along line VIII-VIII of FIG. 6. In addition, in FIGS. 6 to 8, the same components as the liquid crystal display device 2 of the first embodiment shown in FIGS. 2 to 4 are denoted by the same reference numerals and the detailed description thereof will be omitted.

The liquid crystal display device 4 according to the present embodiment is different from the liquid crystal display device 2 according to the first embodiment in that fourth and fifth electrodes 70 and 72 of lower electrodes are formed in addition to the first and second electrodes 10 and 48 on the side of the array substrate AR with an insulating film 42 interposed therebetween.

In the liquid crystal display device 4, the fourth electrode 70 and the fifth electrode 72 respectively having linear portions 70a and 72a extending along the signal lines 16 in parallel with a second separation region 74 interposed therebetween in each pixel are formed on the surface of the planarization film 40. The fourth electrode 70 has the plurality of linear portions 70a and has a longitudinal direction in the Y-axis direction. The fifth electrode 72 has the plurality of linear portions 72a and has a longitudinal direction in the Y-axis direction. One of the pair of the fourth electrode 70 and the fifth electrode 72 may be formed of a metal material such as aluminum, but at least one of the electrodes is preferably formed of a transparent conductive material such as ITO or IZO, in order to increase the numerical aperture.

The fifth electrode 72 is electrically connected to the drain electrode D of the TFT 12 via a first contact 44, and the fourth electrode 70 is electrically connected to the common line 34. Accordingly, the fifth electrode 72 functions as the pixel electrode and the fourth electrode 70 functions as the counter electrode.

The insulating film 42 formed of a silicon nitride layer or a silicon oxide layer is formed on the entire surface of the first transparent substrate 30 on which the fourth electrode 70 and the fifth electrode 72 are formed. The first electrode 10 and the second electrode 48 respectively having the linear portions 10a and 48a extending along the signal lines 16 in parallel with the first separation region 46 interposed therebetween in each pixel are formed on the surface of the insulating film 42. The linear portions 10a of the first electrode 10 and the linear portions 48a of the second electrode 48 are formed so as to overlap with the linear portions 72a of the fifth electrode 72 and the linear portions 70a of the fourth electrode 70 in plan view.

The widths of the linear portions 70a of the fourth electrode 70 and the linear portions 72a of the fifth electrode 72 is larger than those of the linear portions 10a of the first electrode 10 and the linear portions 48a of the second electrode 48. By this configuration, since allowance for misalignment of a mask when the first electrode 10 and the second electrode 48 are formed on the surface of the insulating film 42 by a photolithography is increased, manufacture of the device is facilitated. In addition, the widths of the linear portions 70a of the fourth electrode 70 and the linear portions 72a of the fifth electrode 72 may be equal to those of the linear portions 10a of the first electrode 10 and the linear portions 48a of the second electrode 48. By this configuration, the allowance for misalignment of the mask upon manufacture is decreased, but an applied voltage may be low and a fringe field is generated in all the electrodes. Thus, the liquid crystal display device 4 with a bright display is obtained. In particular, the mutual change of the widths of the linear portions 70a of the fourth electrode 70 and the linear portions 72a of the fifth electrode 72 and the mutual change of the widths of the linear portions 10a of the first electrode 10 and the linear portions 48a of the second electrode 48 do not have an advantage. Accordingly, the widths of the linear portions 70a of the fourth electrode 70 and the linear portions 72a of the fifth electrode 72 may be substantially equal to each other, and the widths of the linear portions 10a of the first electrode 10 and the linear portions 48a of the second electrode 48 may be substantially equal to each other.

The fifth electrode 72 is electrically connected to the drain electrode D of the TFT 12 via the first contact hole 44, and is electrically connected to the first electrode 10. In addition, the fourth electrode 70 is electrically connected to the second electrode 48 via the second contact hole 50.

Figure 16:
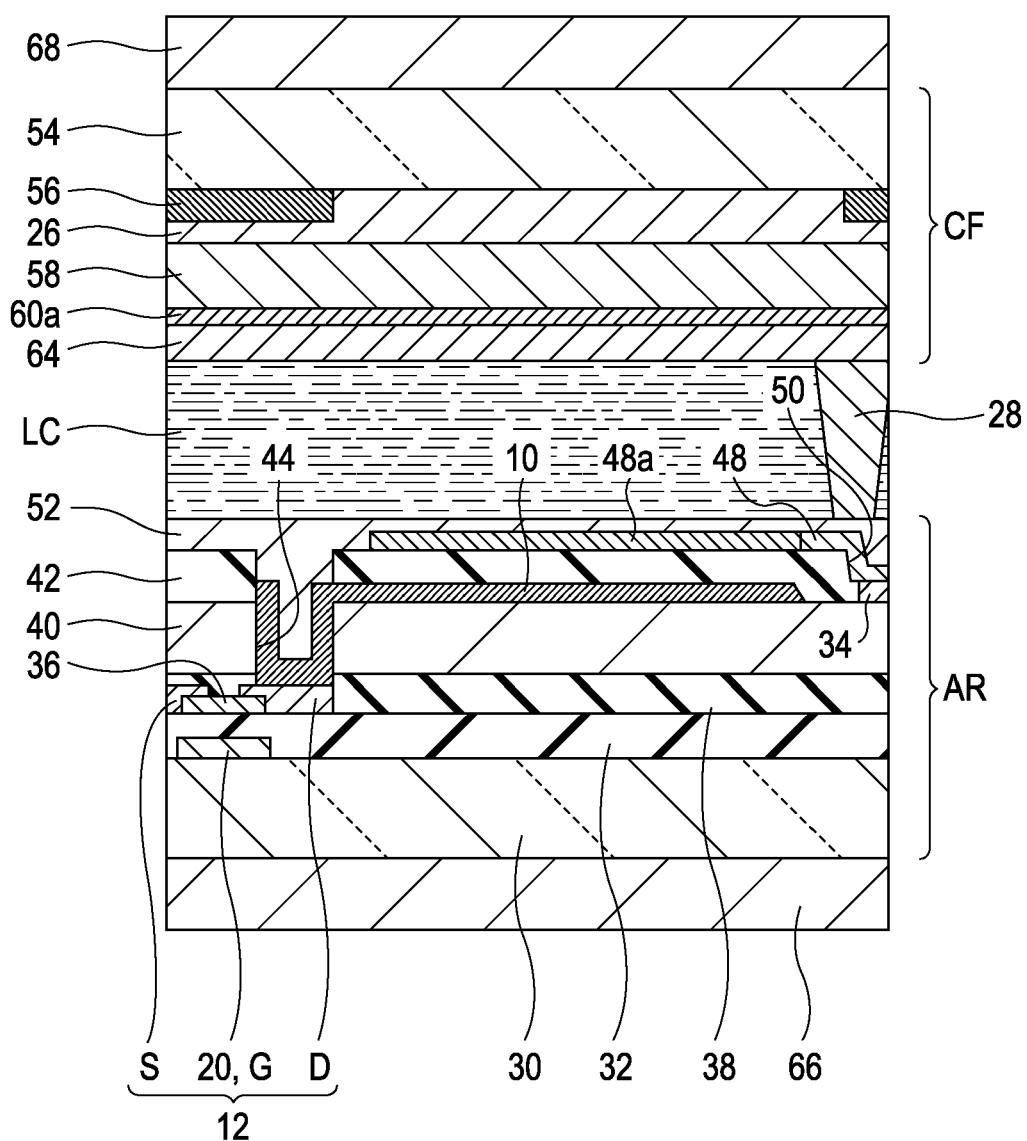
FIG. 16 is a partial cross-sectional view taken along line XVI-XVI of FIG. 14.
Figure 17:
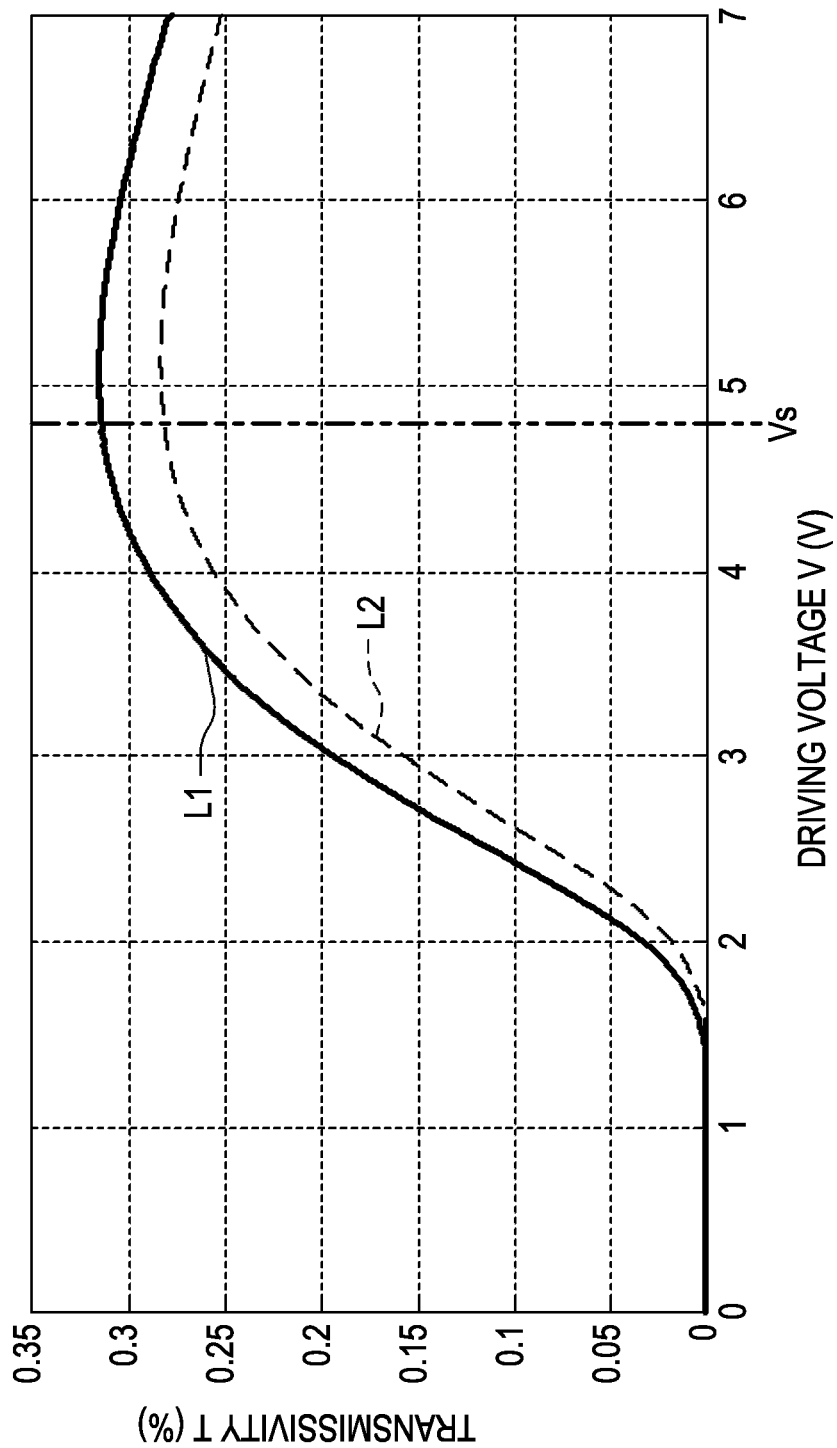
FIG. 17 is a graph of T-V characteristics of the liquid crystal display device according to the fifth embodiment of the invention and a known FFS structure.
Figure 18:
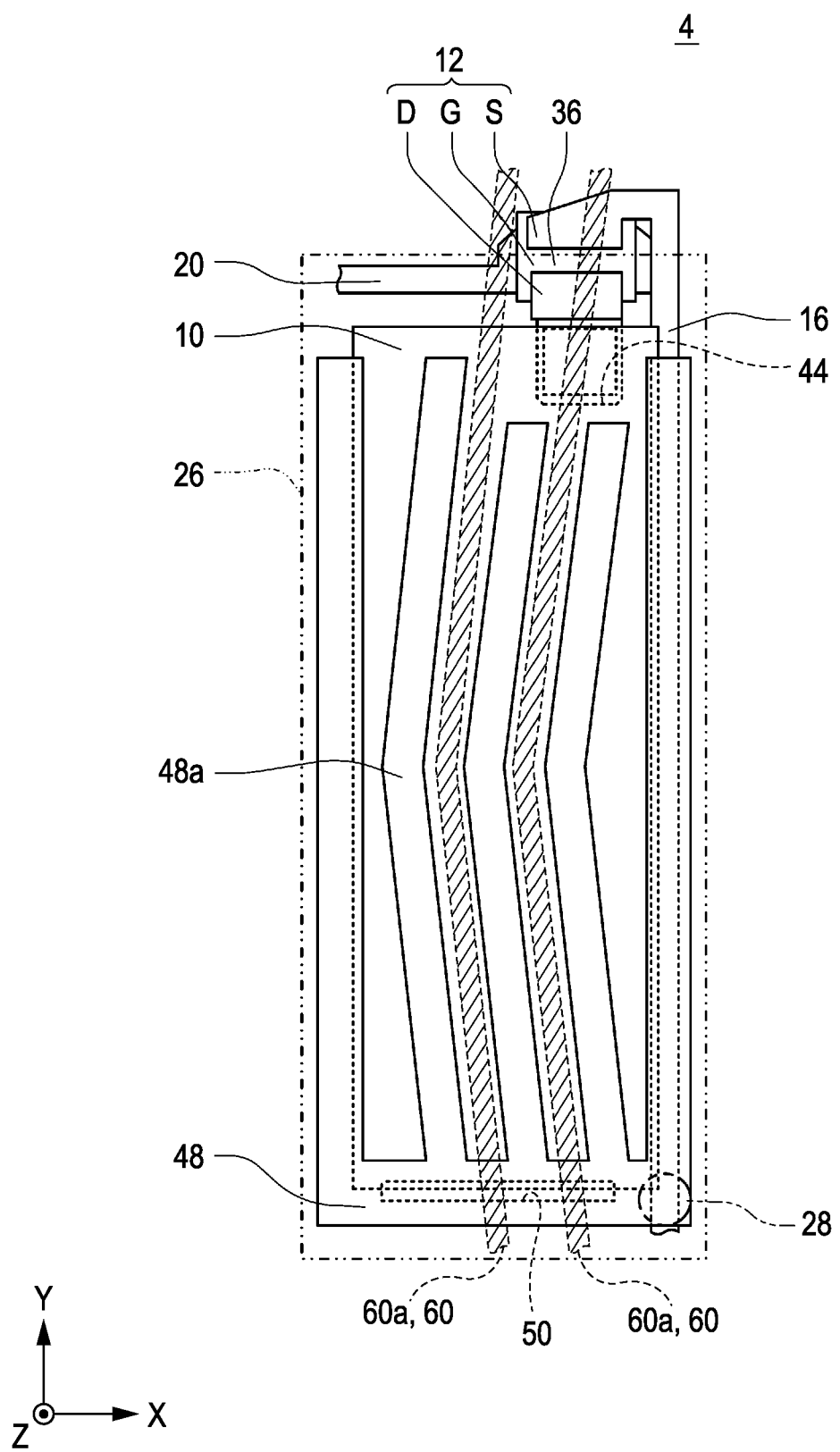
FIG. 18 is a plan view of any one sub pixel seen through a color filter substrate of a liquid crystal display device according to a sixth embodiment of the invention.

Accordingly, the pair formed of the linear portions 10a of the first electrode 10 and the linear portions 70a of the fourth electrode 70 overlapping with each other in plain view and the pair formed of the linear portions 48a of the second electrode 48 and the linear portions 72a of the fifth electrode 72 have the same arrangement relationship as the known FFS mode liquid crystal display device 190 shown in FIGS. 17 and 18. In addition, the pair formed of the linear portions 10a of the first electrode 10 and the linear portions 48a of the second electrode 48 adjacent to each other on the same plane and the pair formed of the linear portions 70a of the fourth electrode 70 and the linear portions 72a of the fifth electrode 72 have the same arrangement relationship as the known IPS mode liquid crystal display device 150 shown in FIGS. 15 and 16.

In addition, in the color filter substrate CF, the third electrode 60 formed of an ITO film is formed on the light shielding film 56 and the color filter layer 26.

Next, the operation of the liquid crystal display device 4 will be described.

In the liquid crystal display device 4, the first electrode 10 and the fifth electrode 72 function as the pixel electrode, and the second electrode 48, the fourth electrode 70 and the third electrode 60 function as the counter electrode. In addition, the linear portions 10a of the first electrode 10 and the linear portions 70a of the fourth electrode 70 overlap with each other in plan view with the insulating film 42 interposed therebetween, the linear portions 48a of the second electrode 48 and the linear portions 72a of the fifth electrode 72 overlap with each other in plan view with the insulating film 42 interposed therebetween, and the linear portions 48a of the second electrode 48 and the linear portions 60a of the third electrode 60 overlap with each other in plan view with the first alignment film 52, the liquid crystal LC and the second alignment film 64 interposed therebetween. Accordingly, when the liquid crystal display device 4 is activated, as shown in FIG. 7, an electric field E1 is applied between the linear portions 10a of the first electrode 10 and the linear portions 48a of the second electrode 48, an electric field E2 is applied between the linear portions 10a of the first electrode 10 and the linear portions 60a of the third electrode 60, and an electric field E3 is applied between the linear portions 10a of the first electrode 10 and the linear portions 70a of the fourth electrode 70. In addition, an electric field E4 is applied between the linear portions 72a of the fifth electrode 72 and the linear portions 48a of the second electrode 48 in the reverse direction to the electric field E3.

The liquid crystal molecules may move by the electric field E2 applied between the linear portions 10a of the first electrode 10 and the linear portions 60a of the third electrode 60. In addition, the operation by the electric field E1 applied between the linear portions 10a of the first electrode 10 and the linear portions 48a of the second electrode 48 is equal to that of the known IPS mode liquid crystal display device shown in FIGS. 15 and 16. Accordingly, the liquid crystal display device 4 operates as the IPS mode liquid crystal display device between the linear portions 10a of the first electrode 10 and the linear portions 48a of the second electrode 48. In addition, the operation by the electric field E3 applied between the linear portions 10a of the first electrode 10 and the linear portions 70a of the fourth electrode 70 and the operation by the electric field E4 applied between the linear portions 72a of the fifth electrode 72 and the linear portions 48a of the second electrode 48 are equal to that of the known FFS mode liquid crystal display device shown in FIGS. 17 and 18. Accordingly, the liquid crystal display device operates as the FFS mode liquid crystal display device between the linear portions 10a of the first electrode 10 and the linear portions 70a of the fourth electrode 70 and between the linear portions 48a of the second electrode 48 and the linear portions 72a of the fifth electrode 72.

Comparison of Transmissivity-Driving Voltage Characteristics

Figure 9:
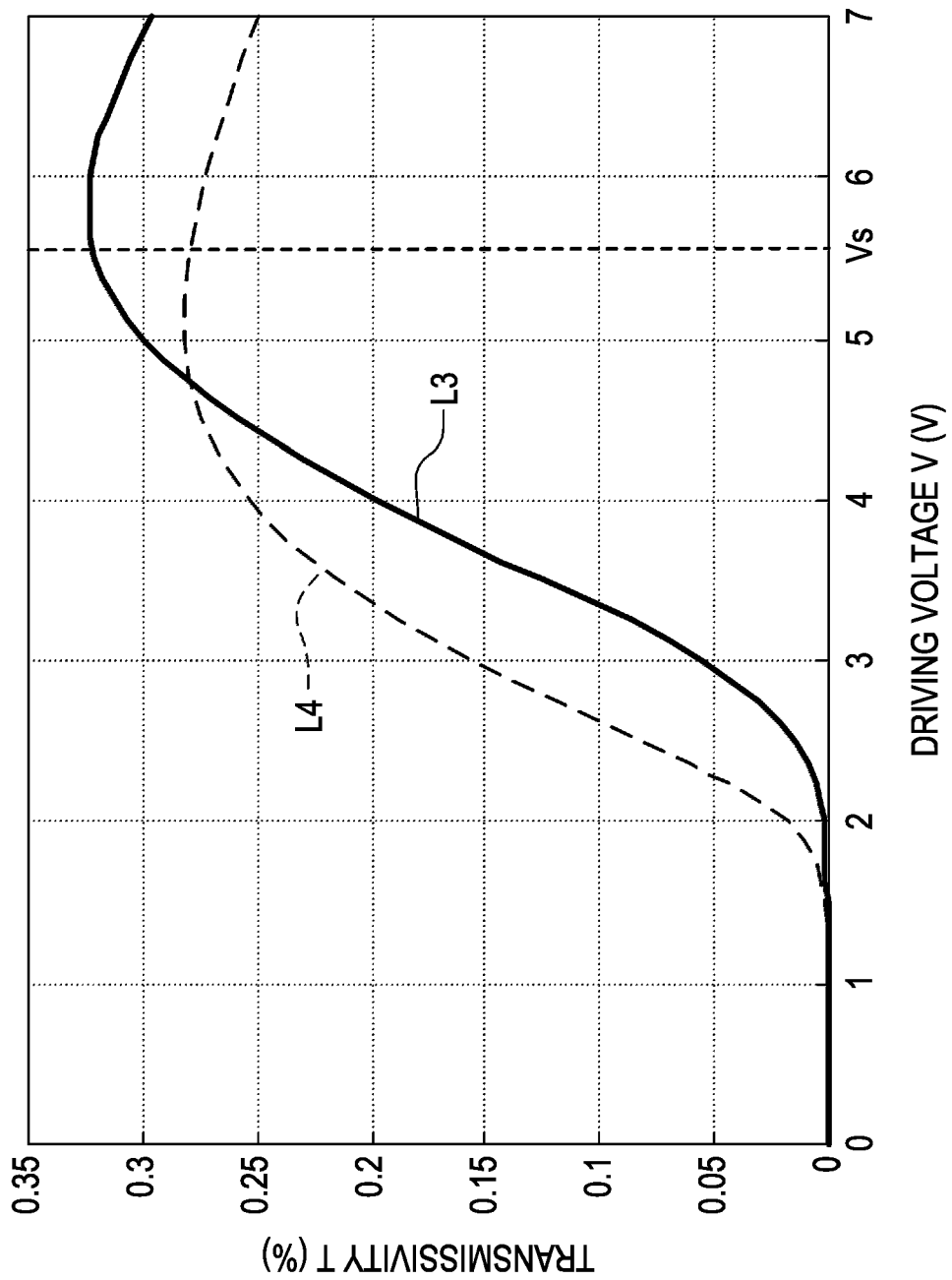
FIG. 9 is a graph of T-V characteristics of the liquid crystal display device according to the second embodiment of the invention and a known FFS structure.

FIG. 9 is a graph of transmissivity T-driving voltage V characteristics of the liquid crystal display device 4 according to the present embodiment and the known FFS mode liquid crystal display device. In addition, a graph L3 denotes the transmissivity T-driving voltage V characteristics of the liquid crystal display device 4 and a graph L4 denotes the transmissivity T-driving voltage V characteristics of the known FFS mode liquid crystal display device.

When the graphs L3 and L4 of the transmissivity T-driving voltage V characteristics are compared, the light transmissivity under application of the selective voltage Vs of the liquid crystal display device 4 is higher than that of the known FFS mode liquid crystal display device.

According to the present embodiment, the linear portions 10a of the first electrode 10 overlap with the linear portions 70a of the fourth electrode 70 in plan view and the linear portions 48a of the second electrode 48 overlap with the linear portions 72a of the fifth electrode 72 in plan view. In addition, the fourth electrode 70 is electrically connected to the second electrode 48, and the fifth electrode 72 is electrically connected to the first electrode 10. Accordingly, the two pairs of electrodes overlapping with each other in plain view with the insulating film 42 interposed therebetween have the same arrangement relationship as the FFS mode liquid crystal display device, and the pair of electrodes adjacent to each other on the same plane has the same arrangement relationship as the IPS mode liquid crystal display device.

Capacitors are formed in the two pairs of electrodes overlapping with each other in plan view with the insulating film 42 interposed therebetween and are connected in parallel. Accordingly, as a result, since a storage capacitor larger than that of the known FFS mode liquid crystal display device is formed, the liquid crystal display device 4 with less flickers is obtained. In addition, since the driving of the liquid crystal in the FFS mode can be realized in all the electrodes, a bright display can be realized, an intermediate configuration of the IPS mode and the FFS mode is obtained with respect to symmetry of the electrodes, generation of a DC component is reduced, and a burn-in phenomenon is improved. The FFS mode liquid crystal display device 4 having the IPS mode property, in which the burn-in phenomenon or flicker is hard to occur, the numerical aperture is large and a bright display is realized, is obtained.

Third Embodiment

Next, a liquid crystal display device 6 according to a third embodiment will be described with reference to FIG. 10.

Figure 10:
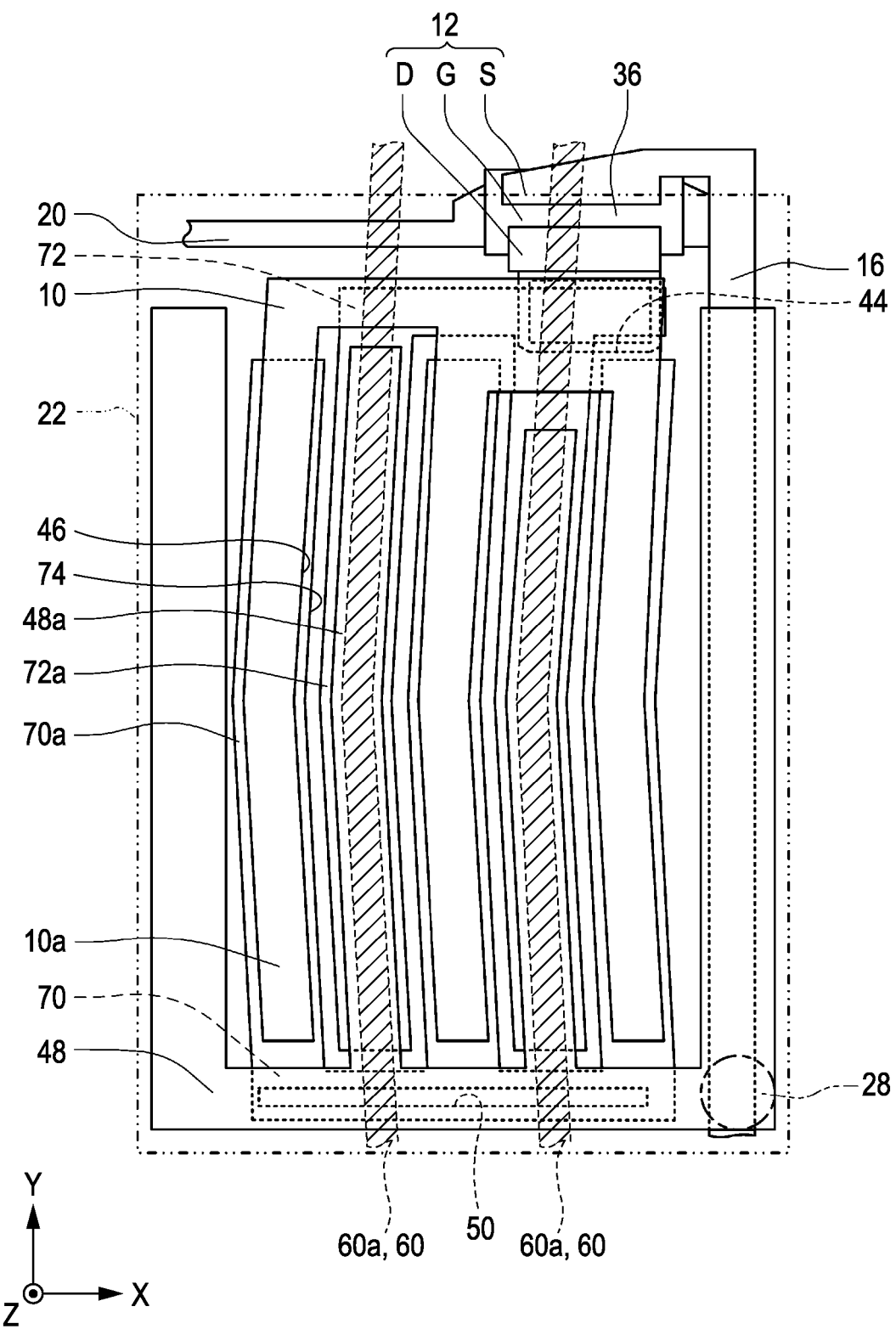
FIG. 10 is a plan view of any one sub pixel seen through a color filter substrate of a liquid crystal display device according to a third embodiment of the invention.

FIG. 10 is a plan view of any one sub pixel seen through a color filter substrate CF of the liquid crystal display device 6 according to the present embodiment. In FIG. 10, the same components as the liquid crystal display device 4 of the second embodiment shown in FIG. 6 are denoted by the same reference numerals and the detailed description thereof will be omitted. The cross-sectional views of FIG. 10 corresponding to line VII-VII and VIII-VIII of FIG. 6 are equal to FIGS. 7 and 8 and thus showing and detailed description thereof will be omitted.

The liquid crystal display device 6 according to the present embodiment is different from the liquid crystal display device 4 according to the second embodiment in that, whereas the linear portions 10a of the first electrode 10 and the linear portions 48a of the second electrode 48 straightly extend along the signal lines 16 in the liquid crystal display device 4 according to the second embodiment, the center portions of the linear portions 10a of the first electrode 10, the linear portions 48a of the second electrode 48, the linear portions 70a of the fourth electrode 70 and the linear portions 72a of the fifth electrode 72 are bent in the liquid crystal display device 6 according to the present embodiment. The linear portions 60a of the third electrode 60 disposed so as to overlap with the linear portions 48a of the second electrode 48 in plan view are also bent.

The liquid crystal display device 6 is a so-called dual-domain device in which the linear portions 10a, 48a, 60a, 70a and 72a of the first to fifth electrodes 10, 48, 60, 70 and 72 are bent using the central portion of each pixel as a border. The rotation direction of the liquid crystal molecules in an upper half region when viewed from a front side of paper and the rotation direction of the liquid crystal molecules in a lower half region when viewed from the front side of paper are opposite to each other, using the central portion of the pixel as a border.

According to the present embodiment, by providing a dual-domain electrode structure, color shift such as yellowish tone or bluish tone can be suppressed by a viewing angle.

Fourth Embodiment

Figure 12:
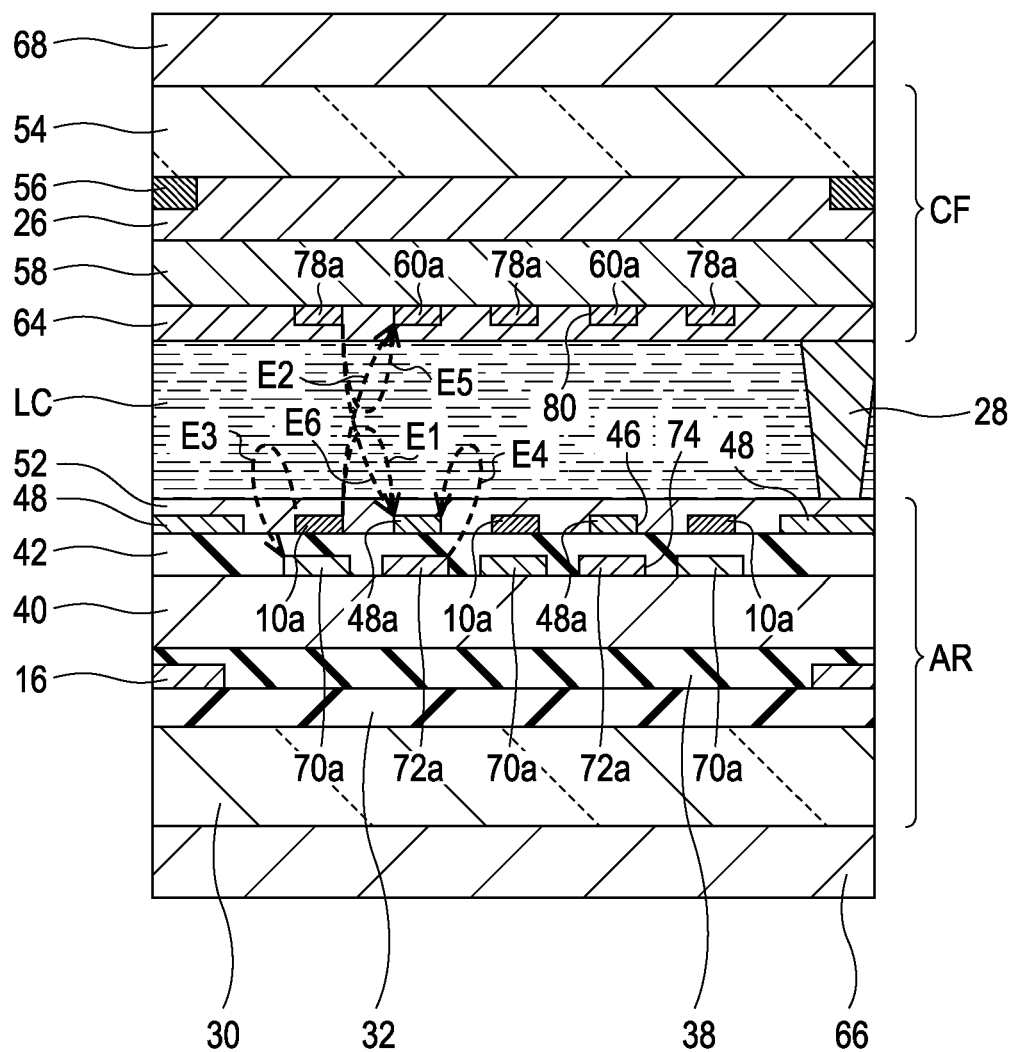
FIG. 12 is a partial cross-sectional view taken along line XII-XII of FIG. 11.
Figure 13:
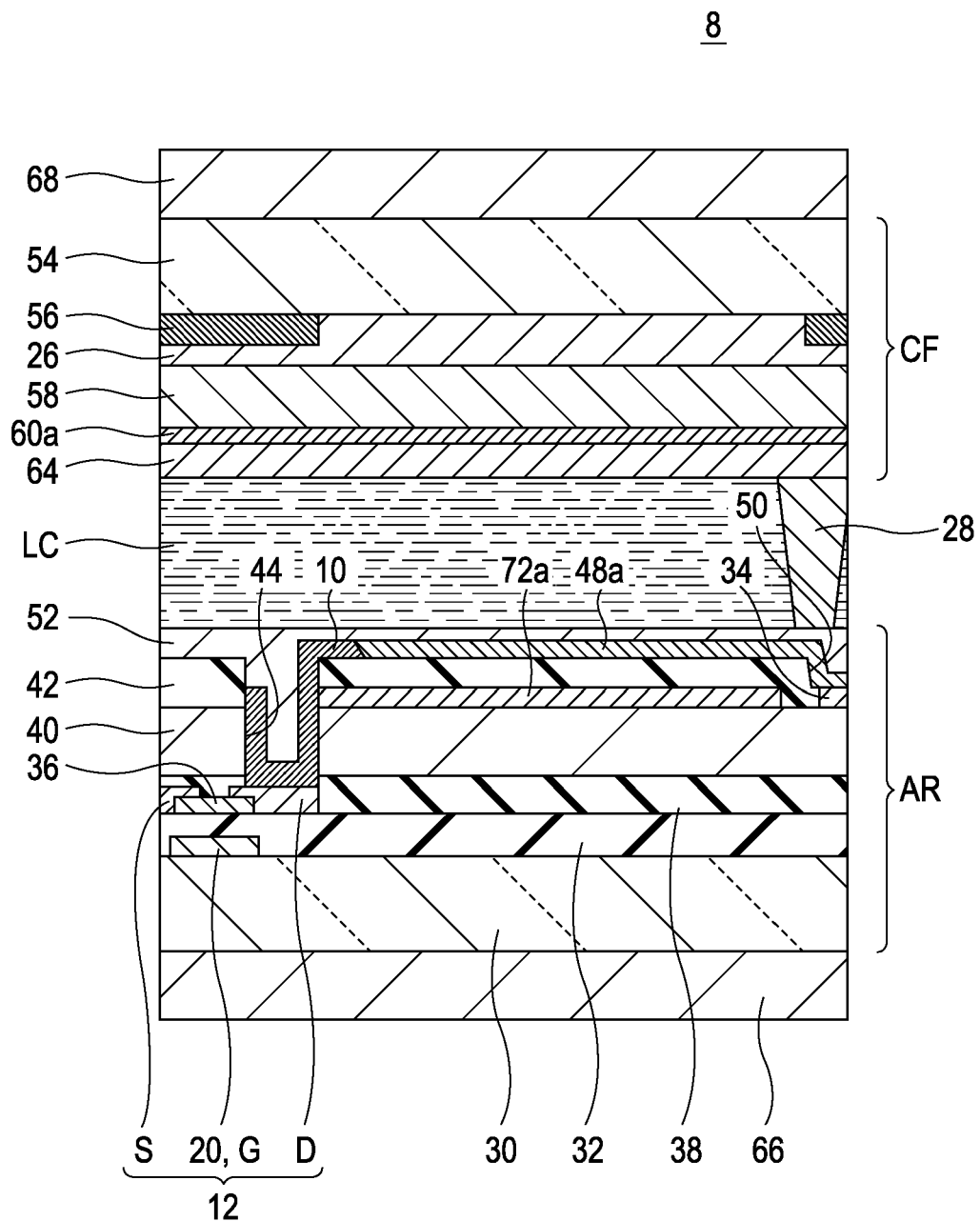
FIG. 13 is a partial cross-sectional view taken along line XIII-XIII of FIG. 11.

Next, a liquid crystal display device 8 according to a fourth embodiment will be described with reference to FIGS. 11 to 13.

Figure 11:
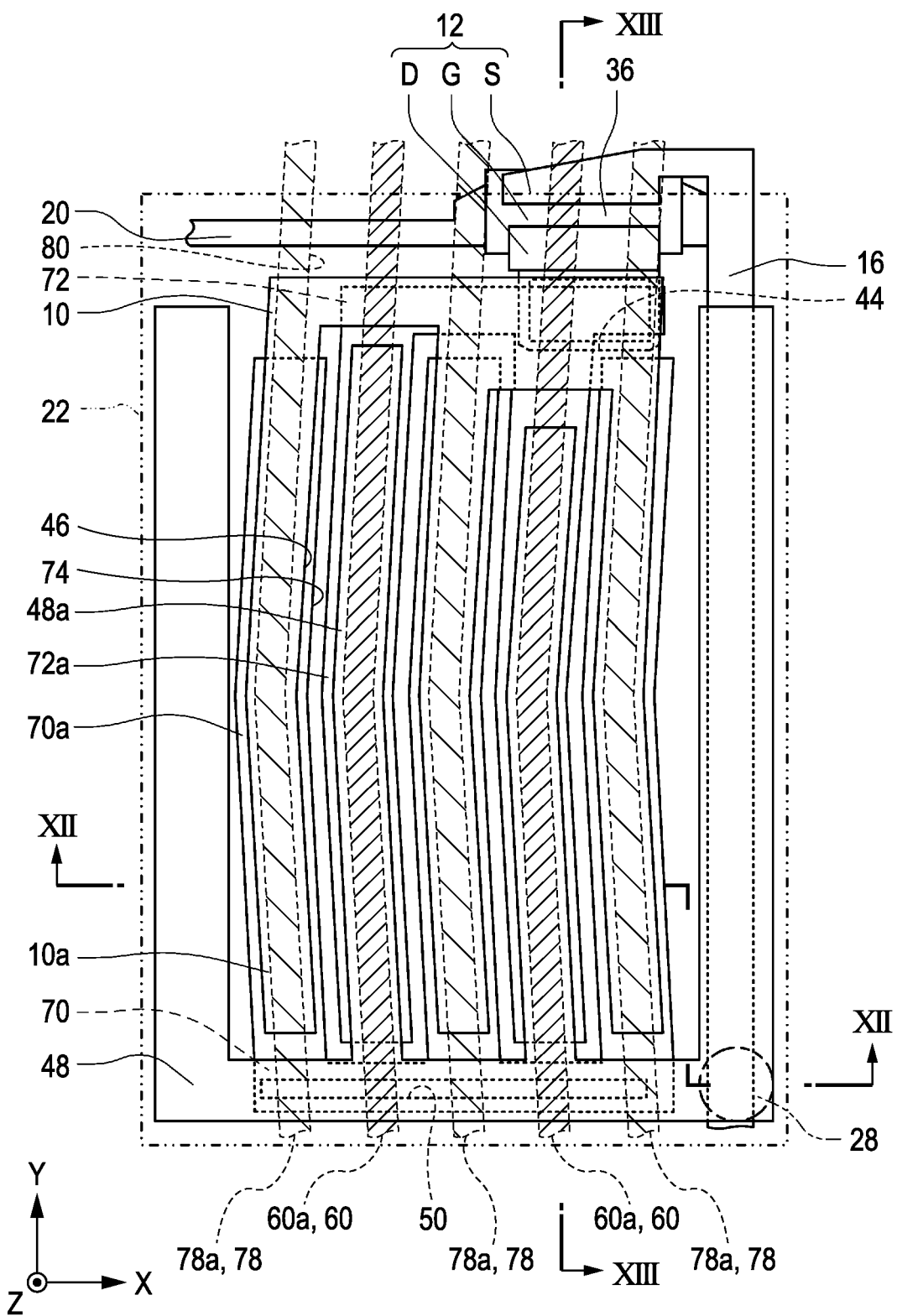
FIG. 11 is a plan view of any one sub pixel seen through a color filter substrate of a liquid crystal display device according to a fourth embodiment of the invention.

FIG. 11 is a plan view of any one sub pixel seen through the color filter substrate CF of the liquid crystal display device 8 according to the present embodiment. FIG. 12 is a partial cross-sectional view taken along line XII-XII of FIG. 11. FIG. 13 is a partial cross-sectional view taken along line XIII-XIII of FIG. 11. In addition, in FIGS. 11 to 13, the same components as the liquid crystal display device 6 of the third embodiment shown in FIGS. 10, 7 and 8 are denoted by the same reference numerals and the detailed description thereof will be omitted.

The liquid crystal display device 8 according to the present embodiment is different from the liquid crystal display device 6 according to the third embodiment in that a sixth electrode 78 for applying a potential different from that of the third electrode 60 is formed on the side of the color filter substrate CF in addition to the configuration of the liquid crystal display device 6 according to the third embodiment.

In the liquid crystal display device 8, the patterned sixth electrode 78 formed of an ITO film is formed on the overcoat layer 58 in each pixel. The sixth electrode 78 has a plurality of linear portions 78a and has a longitudinal direction in the Y-axis direction. The linear portions 78a of the sixth electrode 78 extend along the signal lines 16 in parallel with the linear portions 60a of the third electrode 60 and a third separation region 80 interposed therebetween. The linear portions 78a of the sixth electrode 78 are disposed so as to overlap with the linear portions 10a of the first electrode 10 in plan view. The sixth electrode 78 has slits formed therein so as to overlap with the linear portions 48a of the second electrode 48 in plan view.

As the potential of the sixth electrode 78, at least one of the same potential as the first electrode 10, an intermediate potential of the first electrode 10 and the second electrode 48, a fixed potential, a floating state and so on is applied. By this configuration, by setting the potential of the sixth electrode 78 to a defined potential, it is possible to prevent the linear portions 78a of the sixth electrode 78 from disturbing the alignment of the liquid crystal LC. In addition, a potential having a pulse shape may be applied to the sixth electrode 78. By this configuration, it is possible to permit high-speed response.

A predetermined potential may be applied to such a sixth electrode 78, instead of the case where the sixth electrode is brought into a floating state in potential. When the predetermined potential is applied to the sixth electrode 78, the sixth electrode 78 formed on the side of the liquid crystal LC of the color filter substrate CF and the lines (not shown) formed on the array substrate AR are electrically connected. In contrast, when the sixth electrode 78 is brought into the floating state, the conduction between the substrates is omitted. The sixth electrode 78 is preferably formed of a transparent conductive material such as ITO or IZO in order to enlarge the numerical aperture so as to realize a bright display, but may be formed of a metal material such as aluminum. In the linear portions 78a of the sixth electrode 78, in order to minimize the influence of pair shifting, an electrode for applying a potential by pair shifting may be selected. In addition, the gap between the linear portions 78a of the sixth electrode 78 in one pixel may be arbitrarily shifted such that the influence of pair shifting is minimized.

A second alignment film 64 is formed on the surfaces of the overcoat layer 58, the third electrode 60, and the sixth electrode 78.

The array substrate AR and the color filter substrate CF face each other such that the linear portions 10a of the first electrode 10 and the linear portions 48a of the second electrode 48 of the array substrate AR and the linear portions 78a of the sixth electrode 78 and the linear portions 60a of the third electrode 60 of the color filter substrate CF respectively face each other, and the liquid crystal LC is filled therebetween.

Next, the operation of the liquid crystal display device 8 will be described.

In the liquid crystal display device 8, the first electrode 10, the fifth electrode 72 and the sixth electrode 78 function as the pixel electrode and the second electrode 48, the fourth electrode 70 and the third electrode 60 function as the counter electrode. In addition, the linear portions 10a of the first electrode 10 and the linear portions 70a of the fourth electrode 70 overlap with each other in plan view with the insulating film 42 interposed therebetween, the linear portions 48a of the second electrode 48 and the linear portions 72a of the fifth electrode 72 overlap with each other in plan view with the insulating film 42 interposed therebetween, the linear portions 10a of the first electrode 10 and the linear portions 78a of the sixth electrode 78 overlap with each other in plan view with the first alignment film 52, the liquid crystal LC and the second alignment film 64 interposed therebetween, and the linear portions 48a of the second electrode 48 and the linear portions 60a of the third electrode 60 overlap with each other in plan view with the first alignment film 52, the liquid crystal LC and the second alignment film 64 interposed therebetween. Accordingly, when the liquid crystal display device 8 is activated, as shown in FIG. 12, an electric field E1 is applied between the linear portions 10a of the first electrode 10 and the linear portions 48a of the second electrode 48, an electric field E2 is applied between the linear portions 10a of the first electrode 10 and the linear portions 60a of the third electrode 60, an electric field E3 is applied between the linear portions 10a of the first electrode 10 and the linear portions 70a of the fourth electrode 70, an electric field E4 is applied between the linear portions 72a of the fifth electrode 72 and the linear portions 48a of the second electrode 48 in a reverse direction to the electric field E3, and an electric field E5 is applied between the linear portions 60a of the third electrode 60 and the linear portions 78a of the sixth electrode 78. In addition, an electric field E6 is applied between the linear portions 78a of the sixth electrode 78 and the linear portions 48a of the second electrode 48 in the reverse direction to the electric field E2.

The liquid crystal molecules may move by the electric field E2 applied between the linear portions 10a of the first electrode 10 and the linear portions 60a of the third electrode 60. In addition, the liquid crystal molecules may move by the electric field E6 applied between the linear portions 78a of the sixth electrode 78 and the linear portions 48a of the second electrode 48. In addition, the operation by the electric field E1 applied between the linear portions 10a of the first electrode 10 and the linear portions 48a of the second electrode 48 and the operation by the electric field E5 applied between the linear portions 78a of the sixth electrode 78 and the linear portions 60a of the third electrode 60 are equal to that of the known IPS mode liquid crystal display device shown in FIGS. 15 and 16. Accordingly, the liquid crystal display device 8 operates as the IPS mode liquid crystal display device between the linear portions 10a of the first electrode 10 and the linear portions 48a of the second electrode 48 and between the linear portion 78a of the sixth electrode 78 and the linear portions 60a of the third electrode 60. In addition, the operation by the electric field E3 applied between the linear portions 10a of the first electrode 10 and the linear portions 70a of the fourth electrode 70 and the operation by the electric field E4 applied between the linear portions 72a of the fifth electrode 72 and the linear portions 48a of the second electrode 48 are equal to that of the known FFS mode liquid crystal display device shown in FIGS. 17 and 18. Accordingly, the liquid crystal display device operates as the FFS mode liquid crystal display device between the linear portions 10a of the first electrode 10 and the linear portions 70a of the fourth electrode 70 and between the linear portions 48a of the second electrode 48 and the linear portions 72a of the fifth electrode 72.

According to the present embodiment, the liquid crystal molecules may move by the electric field ES between the linear portions 60a of the third electrode 60 and the linear portions 78a of the sixth electrode 78 on the side of the color filter substrate CF and the electric field E6 between the linear portions 78a of the sixth electrode 78 and the linear portions 48a of the second electrode 48. Accordingly, a bright display can be realized without increasing the driving voltage.

Fifth Embodiment

Next, the planar and cross-sectional configurations of the liquid crystal display device 2 will be described with reference to FIGS. 14 to 16.

Figure 14:
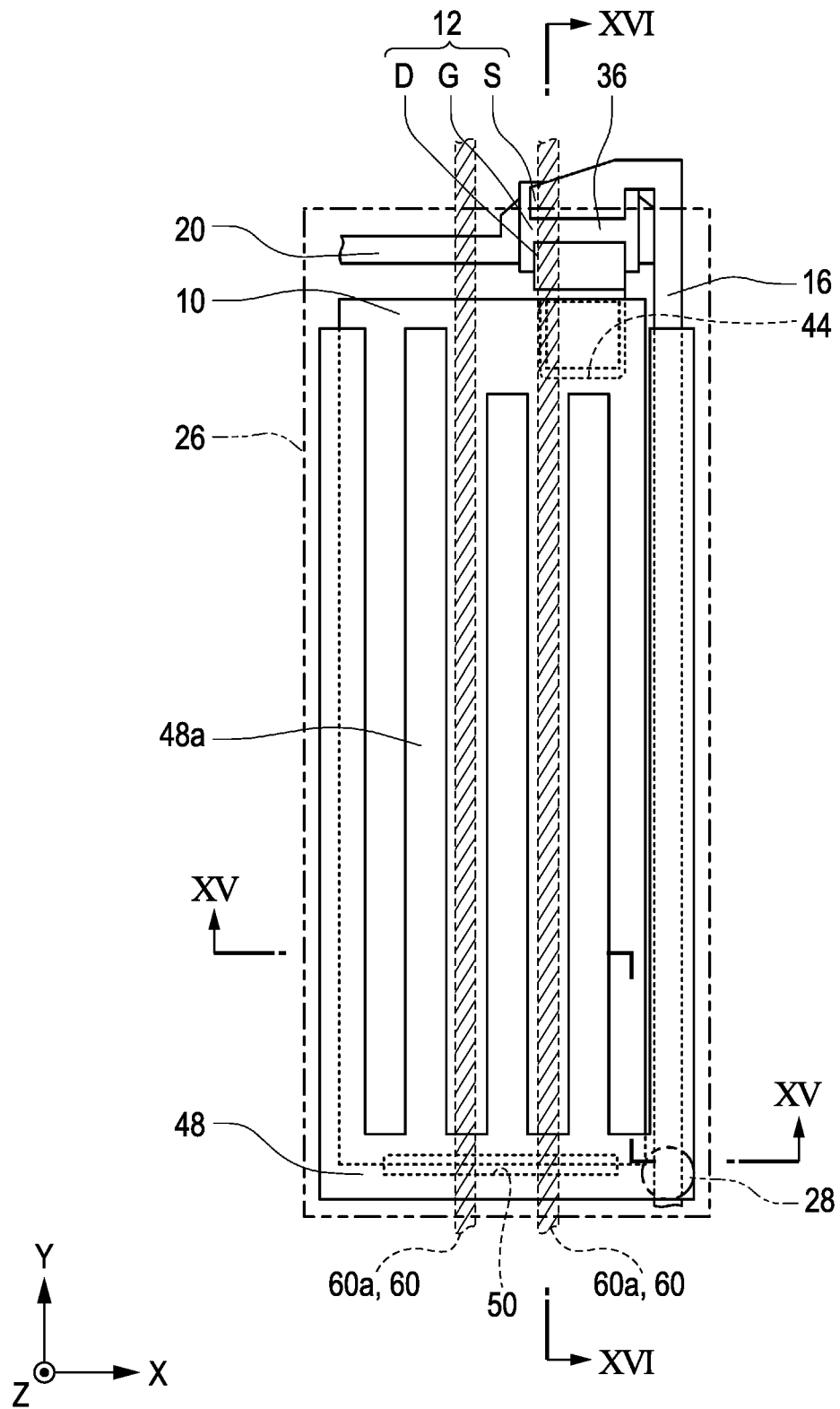
FIG. 14 is a plan view of any one sub pixel seen through a color filter substrate of a liquid crystal display device according to a fifth embodiment of the invention.
Figure 15:
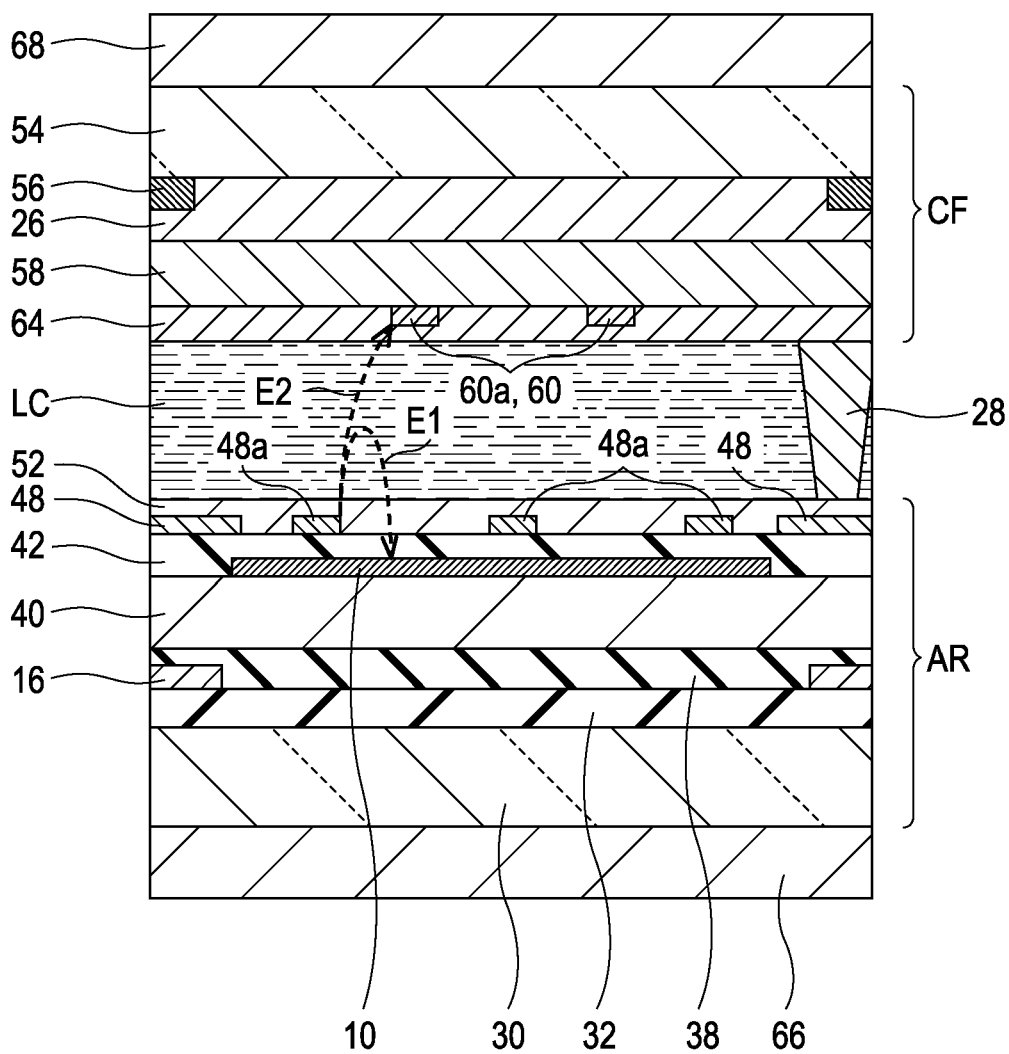
FIG. 15 is a partial cross-sectional view taken along line XV-XV of FIG. 14.

FIG. 14 is a plan view of any one sub pixel seen through the color filter substrate CF of the liquid crystal display device 2 according to the fifth embodiment. FIG. 15 is a partial cross-sectional view taken along line XV-XV of FIG. 14. FIG. 16 is a partial cross-sectional view taken along line XVI-XVI of FIG. 14.

In each of the sub pixel regions of the liquid crystal display device 2 according to the fifth embodiment, the color filter layer 26 having the substantially same planar shape as the sub pixel region is provided. In addition, the columnar spacer 28 for separating the array substrate AR and the color filter substrate CF at a predetermined gap and constantly holding a liquid crystal layer thickness (cell gap) is erected on a right lower corner of each of the sub pixel regions.

The liquid crystal display device 2 includes the array substrate (first substrate) AR and the color filter substrate (second substrate) CF In the array substrate AR, the plurality of scanning lines 20 and signal lines 16 is formed in a matrix on the surface of the display region of the first transparent substrate 30 such as a glass substrate so as to cross each other in a state of being insulated from each other by the gate insulating film 32, and the common line 34 is formed at a peripheral edge portion of the display region. Each of regions surrounded by the scanning lines 20 and the signal lines 16 forms each pixel (also referred to as a "sub pixel"). On the first transparent substrate 30, the TFT 12 is, for example, formed in each pixel as the switching element. In this TFT 12, the semiconductor layer 36 is disposed on the surface of each of the scanning lines 20, a portion of each of the signal lines 16 extends so as to cover a portion of the surface of the semiconductor layer 36 such that a source electrode S is configured, a portion of each of the scanning lines under the semiconductor layer 36 configures a gate electrode G, a conductive layer partially overlapping with a portion of the semiconductor layer 36 configures a drain electrode D, and this drain electrode D is connected to the first electrode 10. The passivation film 38 formed of, for example, a silicon nitride layer or a silicon oxide layer is coated over the entire surface of the first transparent substrate 30 including the TFT 12.

The planarization film 40 formed of an organic material is formed on the surface of the passivation film 38, and the first electrode 10 is formed on the surface of the planarization film 40. The first electrode 10 has a rectangular shape in plan view and has a longitudinal direction in the Y-axis direction (extending direction of the signal lines 16/the lines for supplying the signals). The insulating film 42 formed of a silicon nitride layer or a silicon oxide layer is formed on the surface of the first electrode 10 and the planarization film 40 over the entire surface of the first transparent substrate 30. The first contact hole 44 is formed in the insulating film 42, the planarization film 40 and the passivation film 38 at a location corresponding to the drain electrode D of the TFT 12. The second electrode 48 having the linear portions 48a extending along the signal lines 16 in each pixel is formed on the surface of the insulating film 42. The second electrode 48 has the plurality of linear portions 48a and has a longitudinal direction in the Y-axis direction. The first electrode 10 and the second electrode 48 are preferably formed of a transparent conductive material such as ITO or IZO, in order to enlarge the numerical aperture so as to realize a bright display, but may be formed of a metal material such as aluminum.

The first electrode 10 is electrically connected to the drain electrode D of the TFT 12 via the first contact hole 44, and the second electrode 48 is electrically connected to the common line 34 via the second contact hole 50 formed in the insulating film 42. Accordingly, in the liquid crystal display device 2, the first electrode 10 functions as the counter electrode and the second electrode 48 functions as the pixel electrode.

Accordingly, a pair of the first electrode 10 and the linear portions 48a of the second electrode 48 which overlap with each other with the insulating film 42 interposed therebetween is in the arrangement relationship of an FFS mode liquid crystal display device. Any one of the first electrode 10 and the second electrode 48 is arbitrarily set as the pixel electrode. However, the pair of electrodes which overlap with each other with the insulating film 42 interposed therebetween needs to be a pair of the pixel electrode and the counter electrode.

The first alignment film 52 is formed over the entire display region including the surface of the second electrode 48.

In addition, in the color filter substrate CF, a light shielding film 56 is formed on the surface of the second transparent substrate 54 such as a glass substrate so as to cover locations corresponding to the scanning lines 20, the signal lines 16, the first contact hole 44, the second contact hole 50 and the TFT 12 of the array substrate AR. The color filter layer 26 having a predetermined color is formed on the surface of the second transparent substrate 54 surrounded by the light shielding film 56. In addition, the overcoat layer 58 is formed so as to cover the surfaces of the light shielding film 56 and the color filter layer 26.

The patterned third electrode 60 formed of an ITO film is formed on the overcoat layer 58 in each pixel. By this configuration, the third electrode 60 formed on the surface of the overcoat layer 58, for example, equalizes irregularities due to the presence of the color filter layer 26 or the like so as to become flat, and thus a cell gap becomes uniform. Therefore, according to the liquid crystal display device 2 of the present embodiment, a liquid crystal display device having good display quality is obtained. The third electrode 60 has a plurality of linear portions 60a and has a longitudinal direction in the Y-axis direction. The linear portions 60a of the third electrode 60 are arranged so as not to overlap with the linear portions 48a of the second electrode 48 in plan view.

The linear portions 60a of the third electrode 60 are located between the linear portions 48a of the second electrode 48 in plan view. The third electrode 60 has slits formed therein so as to overlap with the linear portions 48a of the second electrode 48 in plan view. By this configuration, since the third electrode 60 can be efficiently formed even in the vicinity of the TFT 12 or the like, the numerical aperture can be enlarged without waste. The third electrode 60 is formed so as to traverse the plurality of sub pixel regions.

As the potential of the third electrode 60, at least one of the same potential as the first electrode 10, an intermediate potential of the first electrode 10 and the second electrode 48, a fixed potential, a floating state and so on is applied. By this configuration, by setting the potential of the third electrode 60 to a defined potential, it is possible to prevent the linear portions 60a of the third electrode 60 from disturbing the alignment of the liquid crystal LC. In addition, a potential having a pulse shape may be applied to the third electrode 60. By this configuration, it is possible to permit high-speed response.

A predetermined potential may be applied to such a third electrode 60, instead of the case where the third electrode is brought into a floating state in potential. When the predetermined potential is applied to the third electrode 60, the third electrode 60 formed on the side of the liquid crystal LC of the color filter substrate CF and the lines (not shown) formed on the array substrate AR are electrically connected. In contrast, when the third electrode 60 is brought into the floating state, the conduction between the substrates is omitted. The third electrode 60 is preferably formed of a transparent conductive material such as ITO or IZO in order to enlarge the numerical aperture so as to realize a bright display, but may be formed of a metal material such as aluminum.

The second alignment film 64 is formed on the surfaces of the overcoat layer 58 and the third electrode 60.

The array substrate AR and the color filter substrate CF face each other such that the linear portions 48a of the second electrode 48 of the array substrate AR and the linear portions 60a of the third electrode 60 of the color filter substrate CF do not overlap with each other, and the liquid crystal LC is filled therebetween. As the material of the liquid crystal LC, any one of a liquid crystal material having negative dielectric constant anisotropy or a liquid crystal material having positive dielectric constant anisotropy may be used, but the liquid crystal material having negative dielectric constant anisotropy is preferably used. If the liquid crystal material having negative dielectric constant anisotropy is used, a viewing angle under application of a selective voltage (voltage on) widens and the display characteristics of the display device are not damaged. In addition, by using the liquid crystal having negative dielectric constant anisotropy, the influence of a vertical electric field due to pair shifting can be reduced and thus allowance for pair shifting can be improved.

The first polarization plate 66 and the backlight device (not shown) are disposed outside the array substrate AR, and the second polarization plate 68 is disposed outside the color filter substrate CF, thereby completing the liquid crystal display device 2. A retardation film may be disposed between the substrates AR and CF and the polarization plates 66 and 68, if necessary.

Next, the operation of the liquid crystal display device 2 will be described.

In the liquid crystal display device 2, the first electrode 10 and the third electrode 60 function as the counter electrode, and the second electrode 48 functions as the pixel electrode. In addition, the linear portions 48a of the second electrode 48 and the linear portions 60a of the third electrode 60 do not overlap with each other in plan view with the first alignment film 52, the liquid crystal LC and the second alignment film 64 interposed therebetween. Accordingly, when the liquid crystal display device 2 is activated, as shown in FIG. 15, an electric field E1 is applied between the first electrode 10 and the linear portions 48a of the second electrode 48, and an electric field E2 is applied between the linear portions 48a of the second electrode 48 and the linear portions 60a of the third electrode 60.

The liquid crystal molecules may move by the electric field E2 applied between the linear portions 48a of the second electrode 48 and the linear portions 60a of the third electrode 60. In addition, the operation by the electric field E1 applied between the first electrode 10 and the linear portions 48a of the second electrode 48 is equal to that of the known FFS mode liquid crystal display device 190 shown in FIGS. 17 and 18. Accordingly, the liquid crystal display device 2 operates as the FFS mode liquid crystal display device between the first electrode 10 and the linear portions 48a of the second electrode 48.

Comparison of Transmissivity-Driving Voltage Characteristics

FIG. 17 is a graph of transmissivity T-driving voltage V characteristics of the liquid crystal display device 2 according to the fifth embodiment and the known FFS mode liquid crystal display device. In addition, a graph L1 denotes the transmissivity T-driving voltage V characteristics of the liquid crystal display device 2 and a graph L2 denotes the transmissivity T-driving voltage V characteristics of the known FFS mode liquid crystal display device.

When the graphs L1 and L2 of the transmissivity T-driving voltage V characteristics are compared, the light transmissivity under application of the selective voltage Vs of the liquid crystal display device 2 is higher than that of the known FFS mode liquid crystal display device.

According to the fifth embodiment, in addition to the lateral electric field E1 between the first electrode 10 and the linear portions 48a of the second electrode 48, the liquid crystal molecules may move by the electric field E2 between the linear portions 48a of the second electrode 48 and the linear portions 60a of the third electrode 60, and thus a bright display can be realized without increasing the driving voltage. As a result, the transmissivity can be improved without decreasing the space between the linear portions 48a of the second electrode 48 on the side of the array substrate AR In addition, the driving voltage can be decreased by the electrode configuration (the width between the electrodes or the width of the counter electrode) or the electrode location. Accordingly, the liquid crystal display device 2 capable of enhancing (improving) brightness or improving the driving voltage (low driving voltage) is provided.

Sixth Embodiment

Next, a liquid crystal display device 4 according to a sixth embodiment will be described with reference to FIG. 18.

FIG. 18 is a plan view of any one sub pixel seen through a color filter substrate CF of the liquid crystal display device 4 according to the sixth embodiment. In addition, in FIG. 18, the same components as the liquid crystal display device 2 of the fifth embodiment shown in FIG. 14 are denoted by the same reference numerals and the detailed description thereof will be omitted. In FIG. 18, the cross-sectional views of the portions corresponding to the lines XV-XV and XVI-XVI of FIG. 14 are equal to FIGS. 15 and 16 and thus showing and detailed description thereof will be omitted.

The liquid crystal display device 4 according to the sixth embodiment is different from the liquid crystal display device 2 according to the fifth embodiment in that, whereas the linear portions 48a of the second electrode 48 straightly extends along the signal lines 16 in the liquid crystal display device 2 according to the fifth embodiment, the center portions of the linear portions 48a of the second electrode 48 are bent in the liquid crystal display device 4 according to the sixth embodiment. The linear portions 60a of the third electrode 60 disposed so as not to overlap with the linear portions 48a of the second electrode 48 in plan view are also bent.

The liquid crystal display device 4 is a so-called dual-domain device in which the linear portions 48a of the second electrode 48 and the linear portions 60a of the third electrode 60 are bent using the central portion of each pixel as a border. The rotation direction of the liquid crystal molecules in an upper half region when viewed from a front side of paper and the rotation direction of the liquid crystal molecules in a lower half region when viewed from the front side of paper are opposite to each other, using the central portion of the pixel as a border.

According to the sixth embodiment, by providing a dual-domain electrode structure, color shift such as yellowish tone or bluish tone can be suppressed by a viewing angle.

Seventh Embodiment

Next, a liquid crystal display device 6 according to a seventh embodiment will be described with reference to FIGS. 19 and 20.

Figure 19:
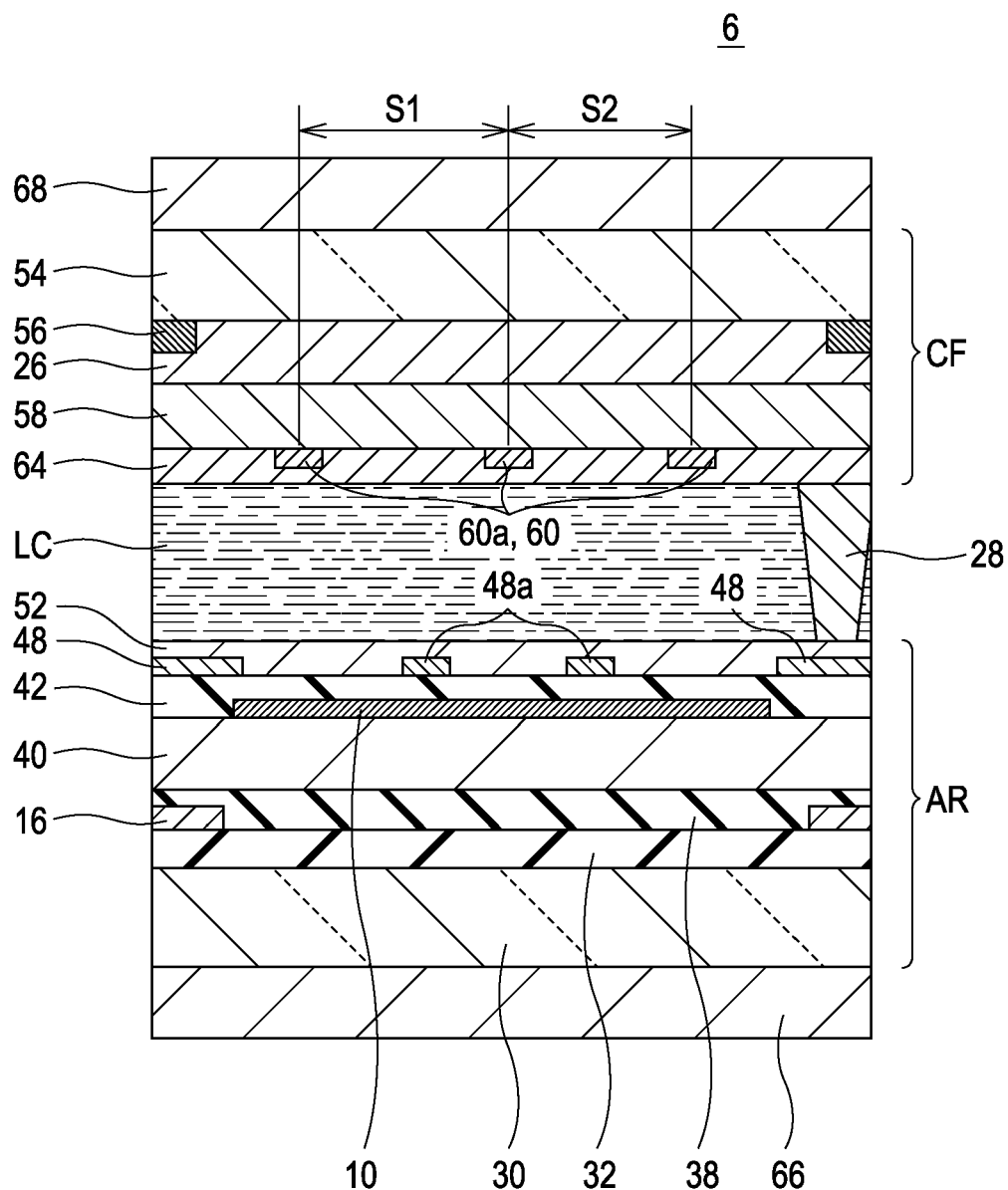
FIG. 19 is a cross-sectional view of a liquid crystal display device according to a seventh embodiment of the invention.
Figure 20:
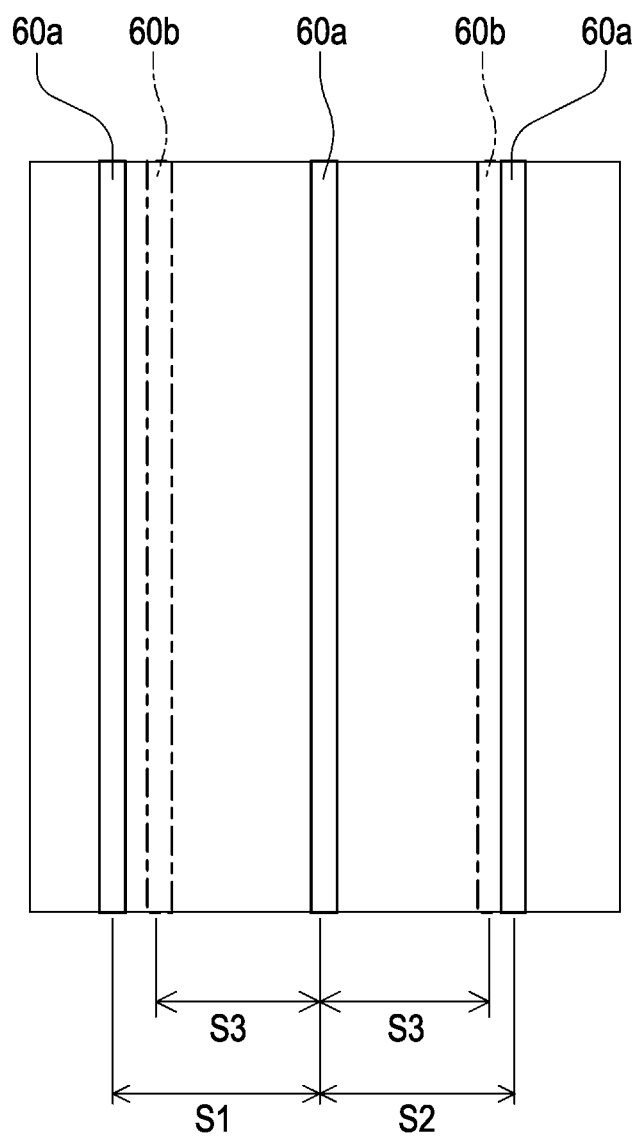
FIG. 20 is a view explaining linear portions of a third electrode according to the seventh embodiment of the invention.

FIG. 19 is a cross-sectional view of the liquid crystal display device 6 according to the seventh embodiment. FIG. 20 is a view explaining the linear portions 60a of the third electrode 60 according to the seventh embodiment. In addition, in FIG. 19, the same components as the liquid crystal display device 2 of the fifth embodiment shown in FIG. 15 are denoted by the same reference numerals and the detailed description thereof will be omitted.

The liquid crystal display device 6 according to the seventh embodiment is different from the liquid crystal display device 2 according to the fifth embodiment in that, whereas the linear portions 60a of the third electrode 60 does not overlap with the linear portions 48a of the second electrode 48 in plan view in the liquid crystal display device 2 according to the fifth embodiment, the gaps between the linear portions 60a of the third electrode 60 are different in one pixel in the liquid crystal display device 6 according to the present embodiment.

In the liquid crystal display device 6, the gaps between the linear portions 60a of the third electrode 60 are different in at least one pixel. The gaps between the linear portions 60a of the third electrode 60 may be arbitrarily shifted in one pixel. For example, as shown in FIG. 19, the relationship between the gap Si and the gap S2 between the linear portions 60a of the third electrode 60 is expressed as the gap Si>the gap S2. In detail, as shown in FIG. 20, compared with the imaginary linear portions 60b disposed at the same gap S3, the linear portions 60a located at the left side of the central linear portion 60a when viewed from the front side of paper has a relationship of the gal Si>the gap S3, and the linear portion 60a located at the right side has a relationship of the gap S2>the gap S3.

According to the seventh embodiment, since allowance for pair shifting when the array substrate AR and the color filter substrate CF are assembled is increased, it is possible to reduce the deterioration of transmissivity due to pair shifting.

In addition, in the linear portions 60a of the third electrode 60, in order to minimize the influence of the pair shifting, an electrode for applying a potential by pair shifting may be selected.

Electronic Apparatus

Next, an electronic apparatus including the above-described liquid crystal display device will be described.

Figure 21:
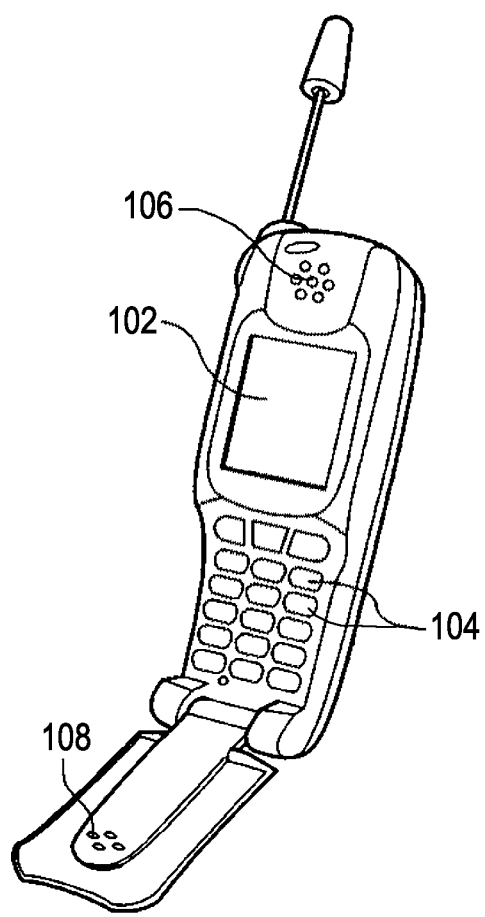
FIG. 21 is a perspective view of a mobile telephone which is an example of an electronic apparatus in which the liquid crystal display device according to the present embodiment is mounted in a display unit.
Figure 22:
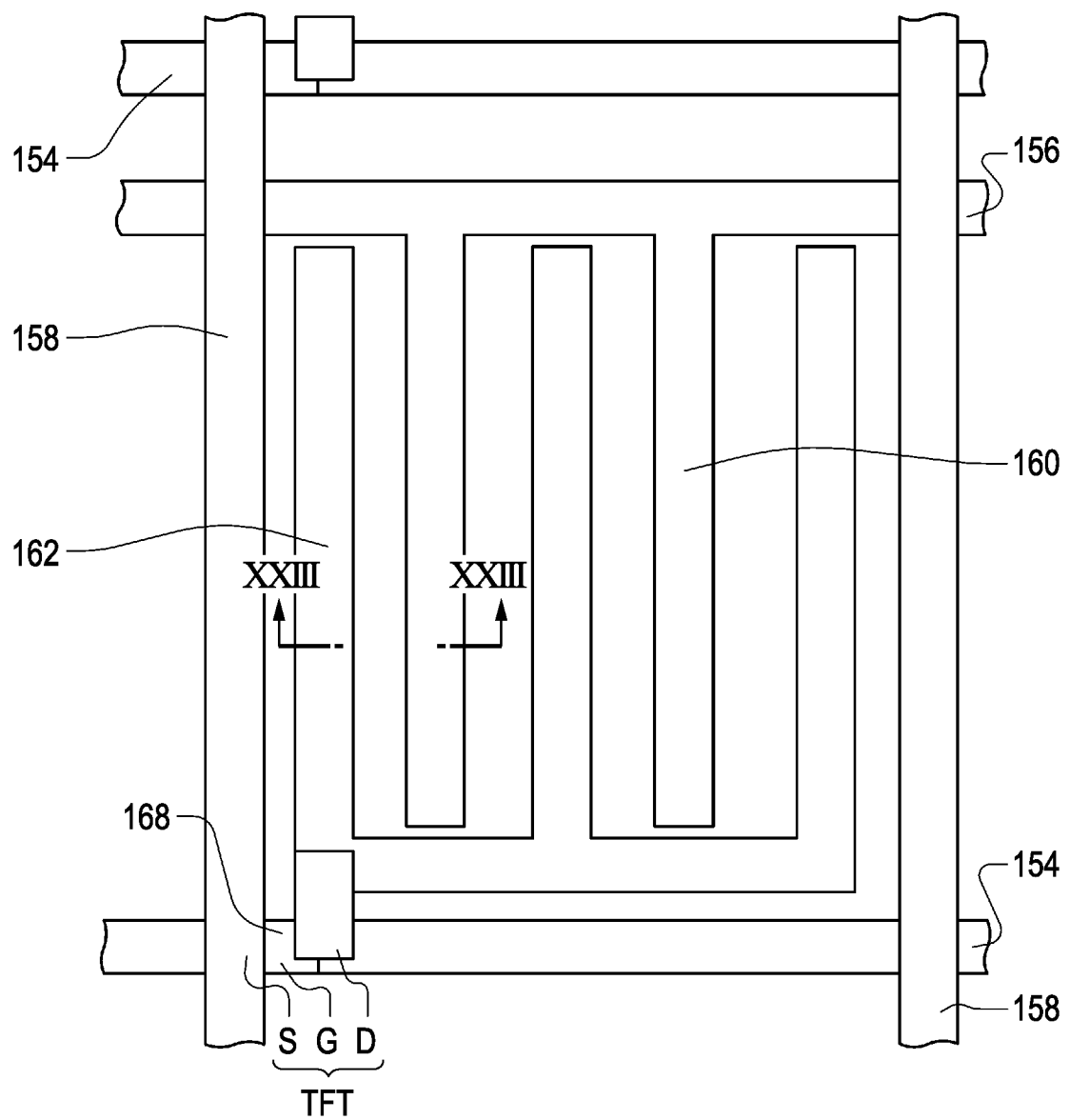
FIG. 22 is a schematic plan view of one pixel seen through a color filter substrate of a known IPS mode liquid crystal display device.
Figure 23:
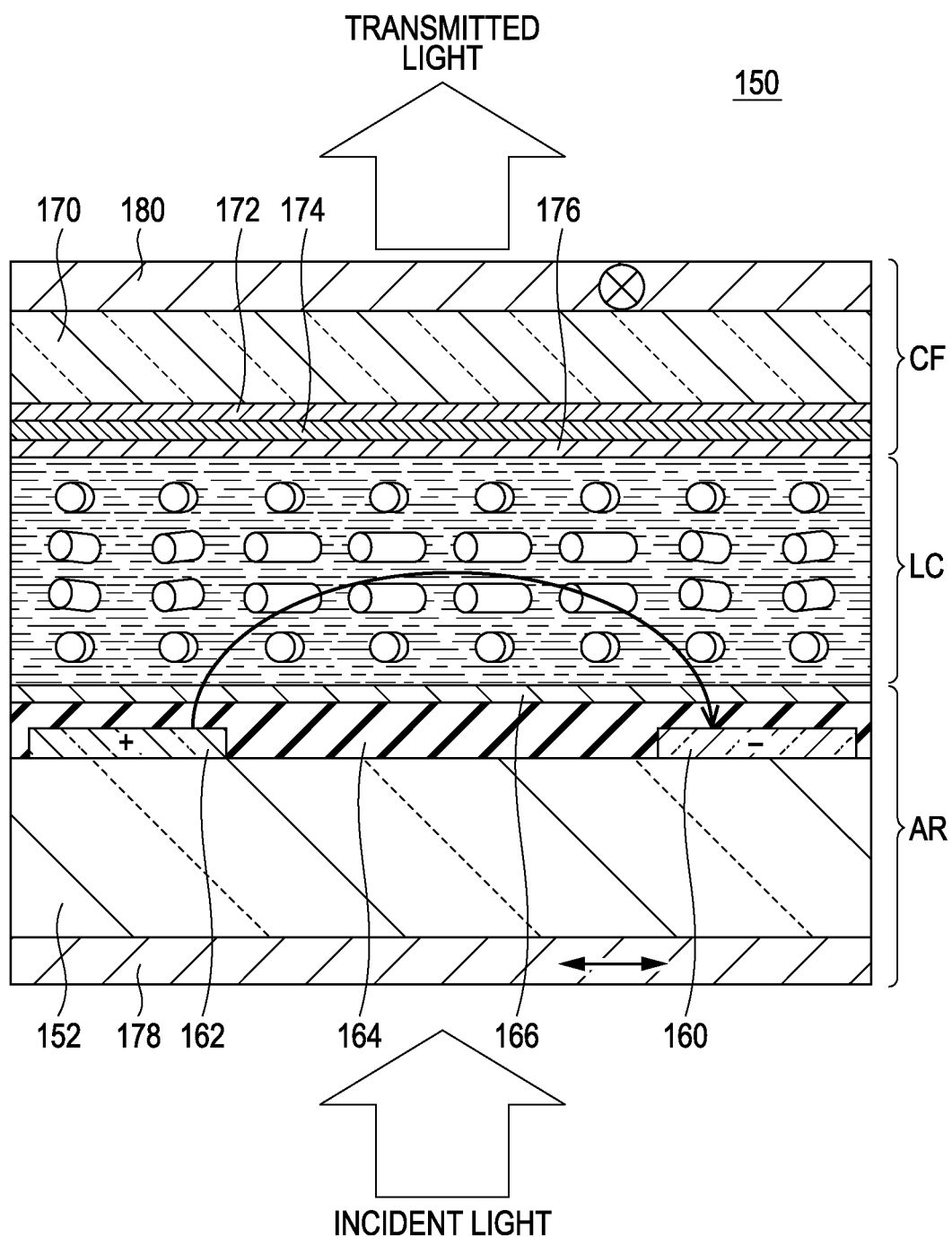
FIG. 23 is a cross-sectional view taken along line XXIII-XXIII of FIG. 22.
Figure 24:
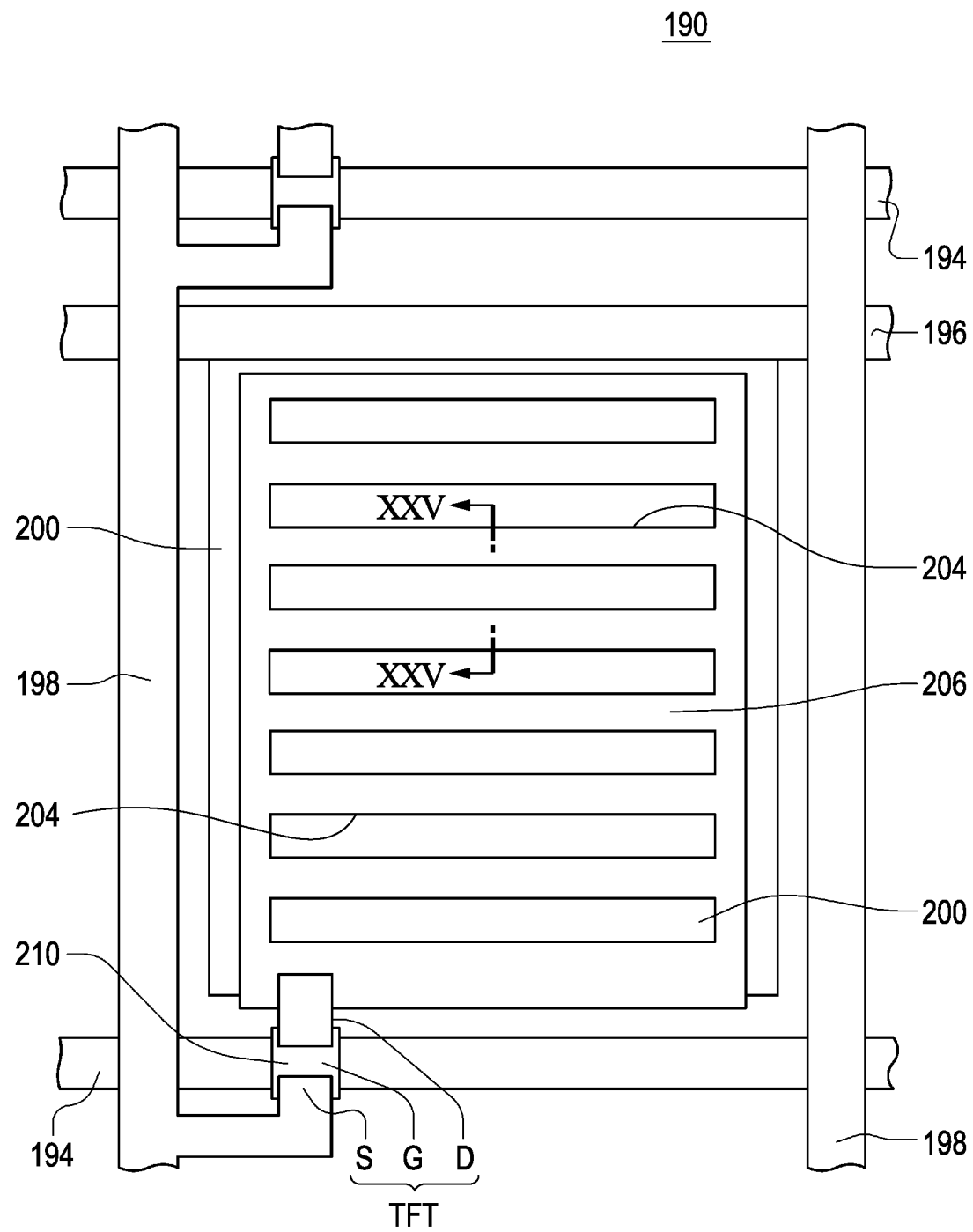
FIG. 24 is a schematic plan view of one pixel seen through a color filter substrate of a known FFS mode liquid crystal display device.
Figure 25:
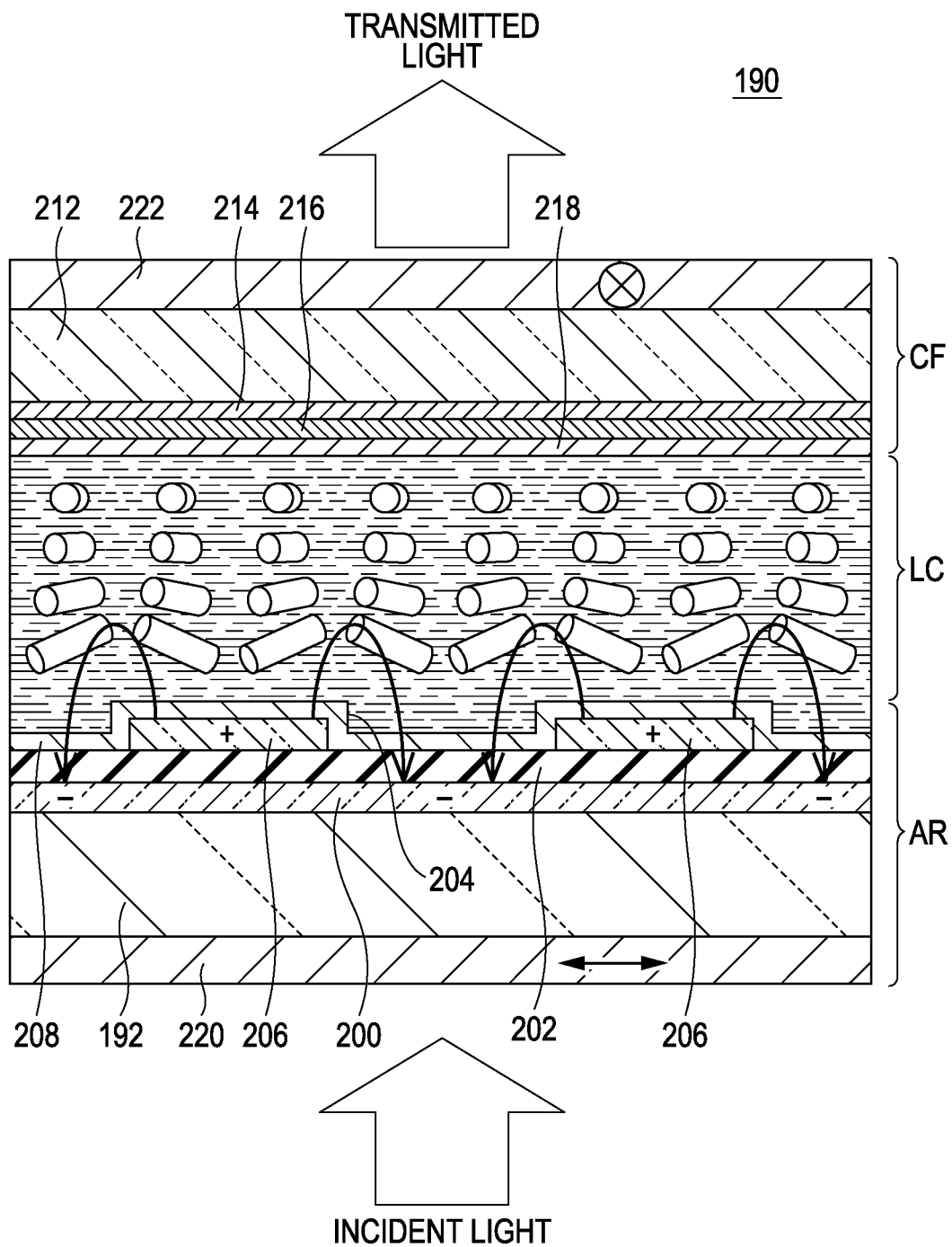
FIG. 25 is a cross-sectional view taken along line XXV-XXV of FIG. 24.

FIG. 21 is a perspective view of a mobile telephone 100 which is an example of an electronic apparatus in which the liquid crystal display device according to the present embodiment is mounted in a display unit.

The mobile telephone 100 according to the present embodiment includes the liquid crystal display device according to each of the above-described embodiments as a small-sized display unit 102, and includes a plurality of operation buttons 104, an ear piece 106 and a mouthpiece 108. Since the mobile telephone 100 includes the liquid crystal display device according to each of the above-described embodiments, an electronic apparatus with excellent display quality can be provided.

The liquid crystal display device according to each of the above-described embodiments may be suitably used as an image display unit of an electronic book, a personal computer, a digital still camera, a liquid crystal TV set, a viewfinder-type or direct-view monitor type video tape recorder, a car navigation system, a pager, an electronic organizer, an electronic calculator, a word processor, a workstation, a videophone, a POS terminal, or a touch-panel equipped device, in addition to the mobile telephone. The above-described electronic apparatus can be implemented as a display unit of such exemplary electronic devices. Even in any electronic apparatus, an electronic apparatus with excellent display quality can be provided.

Although the embodiments are described, for example, the following modified examples may be considered.

MODIFIED EXAMPLE 1

Although the linear portions 60a of the third electrode 60 (the linear portions 78a of the sixth electrode 78) have the longitudinal direction along the signal lines 16 in the liquid crystal display device according to each of the above-described embodiments, the same effects are obtained even when the linear portions have the longitudinal direction along the scanning lines 20.

MODIFIED EXAMPLE 2

Although a shield electrode generally used on the color filter substrate side is not included in the liquid crystal display device according to each of the above-described embodiment, the color filter substrate may have the shield electrode. For example, since a conductor is not included on the color filter substrate side of a general lateral electric field type liquid crystal display device, the shield electrode needs to be provided for an antistatic countermeasure. However, since the electrode is provided on the side of the liquid crystal LC of the color filter substrate CF in the present embodiment, the shield electrode is unnecessary. Even when the shield electrode for preventing electrification due to static electricity in the color filter substrate CF is not formed, since the patterned linear portions 60a of the third electrode 60 are formed, the electrification due to static electricity is hard to occur in the color filter substrate CF, and the alignment of the liquid crystal is not disturbed even when electricity occurs. In addition, since the patterned linear portions 60a of the third electrode 60 are formed on the side of the liquid crystal LC of the color filter substrate CF, the electrodes patterned in the substrate state before the liquid crystal panel is assembled can be formed.

MODIFIED EXAMPLE 3

Although the liquid crystal display device according to each of the above-described embodiments is a transmissive type liquid crystal display device, the invention is not limited thereto. For example, a reflective type or transflective and reflective type liquid crystal display device may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
   first and second substrates with a liquid crystal layer interposed therebetween;
   a first electrode formed on the liquid crystal layer side of the first substrate and having linear portions;
   a second electrode having linear portions formed to extend in the same direction as the linear portions of the first electrode and formed to be coplanar to linear portions of the first electrode, and gaps formed between the linear portions of the first and second electrodes;
   a third electrode formed on the liquid crystal layer side of the second substrate and having linear portions overlapping with the linear portions of the second electrode in plan view,
      the third electrode being formed of a transparent conductive material,
      the linear portions of the third electrode having a longitudinal direction along scanning lines or signal lines formed on the first substrate, and
      a potential of the third electrode being at least one of a potential of the second electrode, an intermediate potential between the voltage of the first electrode and the voltage of the second electrode, a fixed potential, and a floating state in potential;
   a fourth electrode having linear portions formed nearer the liquid crystal layer side of the first substrate than the first electrode and the second electrode,
   the fourth electrode being formed such that the linear portions thereof overlap the linear portions of the first electrode in plan view with an insulating film interposed therebetween, and the fourth electrode being electrically connected to the second electrode; and
   a fifth electrode having linear portions formed to extend in the same direction as the linear portions of the fourth electrode and formed to be coplanar to linear portions of the fourth electrode, and gaps formed between the linear portions of the fourth and fifth electrodes,
      the fifth electrode being on a same layer of the linear portions of the fourth electrode,
      the fifth electrode being formed such that the linear portions thereof overlap with those of the second electrode in plan view, and
      the fifth electrode being electrically connected to the first electrode,
   wherein electric fields are generated between the first and second electrodes, the first and third electrodes, and the first and fourth electrodes, and the electric fields have different directions for each other.

2. The liquid crystal display device according to claim 1, wherein a width of the linear portions of the fourth electrode is larger than a width of the linear portions of the first electrode, and a width of the linear portions of the fifth electrode is larger than a width of the linear portions of the second electrode.

3. The liquid crystal display device according to claim 1, wherein a width of the linear portions of the fourth electrode is equal to a width of the linear portions of the first electrode, and a width of the linear portions of the fifth electrode is equal to a width of the linear portions of the second electrode.

4. An electronic apparatus comprising the liquid crystal display device according to claim 1 in a display unit.

* * * * *